(12) United States Patent
Grigoryev et al.

(10) Patent No.: US 10,589,451 B2
(45) Date of Patent: Mar. 17, 2020

(54) METHODS OF MAKING THREE DIMENSIONAL STRUCTURES HAVING ALIGNED NANOFIBERS AND THE RESULTING STRUCTURES PRODUCED BY SUCH METHODS

(71) Applicant: New York University, New York, NY (US)

(72) Inventors: Nikita Grigoryev, Brooklyn, NY (US); Kalle Levon, Brooklyn, NY (US)

(73) Assignee: New York University, New York, NY (US)

( * ) Notice: Subject to any disclaimer, the term of this patent is extended or adjusted under 35 U.S.C. 154(b) by 385 days.

(21) Appl. No.: 15/388,508

(22) Filed: Dec. 22, 2016

(65) Prior Publication Data
US 2017/0203484 A1     Jul. 20, 2017

Related U.S. Application Data

(60) Provisional application No. 62/271,174, filed on Dec. 22, 2015.

(51) Int. Cl.
*B29C 41/08*     (2006.01)
*B29C 41/14*     (2006.01)
(Continued)

(52) U.S. Cl.
CPC ........ *B29C 48/142* (2019.02); *B29C 37/0025* (2013.01); *B29C 64/106* (2017.08); *B29C 64/20* (2017.08); *B29C 64/209* (2017.08); *B32B 5/24* (2013.01); *B33Y 10/00* (2014.12); *B33Y 30/00* (2014.12); *D01D 5/0038* (2013.01); *D01D 5/0076* (2013.01); *D01D 5/0092* (2013.01); *D04H 1/728* (2013.01); *D04H 1/76* (2013.01); *B29C 41/006* (2013.01);
(Continued)

(58) Field of Classification Search
CPC ... B29C 37/0025; B29C 41/08; B29C 41/085; B29C 41/14; B29C 41/20; B29C 41/22; D01D 5/0007; D01D 5/0015; D01D 5/0023; D01D 5/003; D01D 5/0038; D01D 5/0046; D01D 5/0076
USPC ...... 264/10, 129, 171.1, 236, 259, 307, 310, 264/464, 465, 466, 484
See application file for complete search history.

(56) References Cited

U.S. PATENT DOCUMENTS

| | | | | |
|---|---|---|---|---|
| 2006/0002978 A1* | 1/2006 | Shea | ...................... | A61K 38/18 424/426 |
| 2010/0233115 A1* | 9/2010 | Patel | .................... | D01D 5/0076 425/174.8 E X |
| 2013/0150963 A1* | 6/2013 | Johnson | .................... | A61F 2/20 623/9 |

\* cited by examiner

*Primary Examiner* — Leo B Tentoni
(74) *Attorney, Agent, or Firm* — John C. Pokotylo; Pokotylo Patent Services

(57) ABSTRACT

Apparatus for producing a three dimensional nanofiber structure includes (1) at least two spaced electrodes; (2) a spinner adapted to rotate the at least two spaced electrodes; (3) a syringe assembly adapted to eject a polymer solution from a syringe of the syringe assembly towards the at least two spaced electrodes while the at least two spaced electrodes are rotated by the spinner; and (4) a power supply assembly for providing the two spaced electrodes at a first electric potential, and for providing the syringe at a second electric potential which is different from the first electric potential. A composition of matter may include (1) a least one layer of nanofibers in which a distribution of angles of (Continued)

fibers is "aligned;" and (2) at least one gel layer, wherein the at least one layer of microfibers and the at least one gel layer alternate to form a laminate.

19 Claims, 33 Drawing Sheets

(51) Int. Cl.
*B29C 41/20* (2006.01)
*B29C 41/22* (2006.01)
*B29C 48/14* (2019.01)
*B33Y 10/00* (2015.01)
*B33Y 30/00* (2015.01)
*B29C 64/106* (2017.01)
*D04H 1/728* (2012.01)
*D01D 5/00* (2006.01)
*B29C 64/209* (2017.01)
*B29C 64/20* (2017.01)
*B32B 5/24* (2006.01)
*D04H 1/76* (2012.01)
*B29C 37/00* (2006.01)
*B29K 67/00* (2006.01)
*B29L 31/00* (2006.01)
*B29K 105/12* (2006.01)
*B29C 41/00* (2006.01)

(52) U.S. Cl.
CPC ...... *B29C 41/085* (2013.01); *B29K 2067/046* (2013.01); *B29K 2105/122* (2013.01); *B29L 2031/7532* (2013.01)

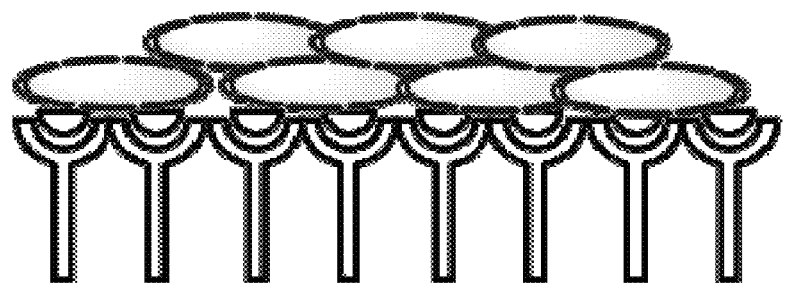
[Fibronectin]: High, Rapid growth
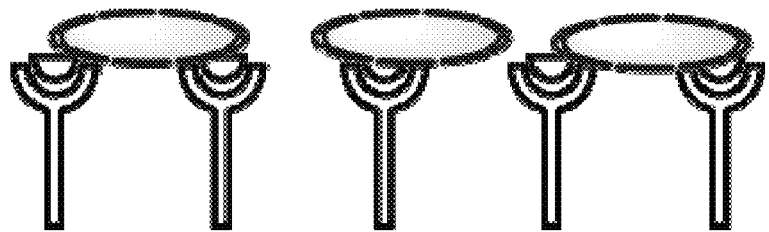
[Fibronectin]: Medium, Low growth
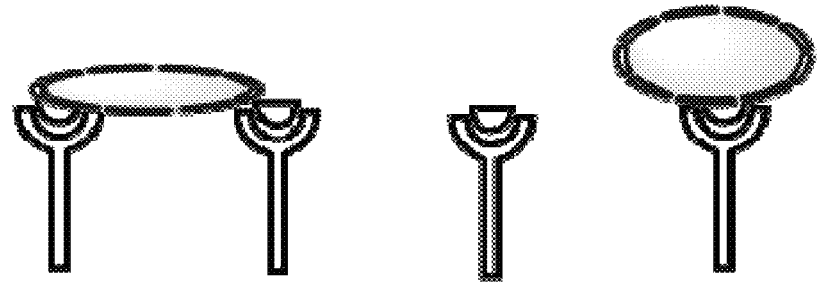
[Fibronectin]: Low, Quiescence
FIGURE 5

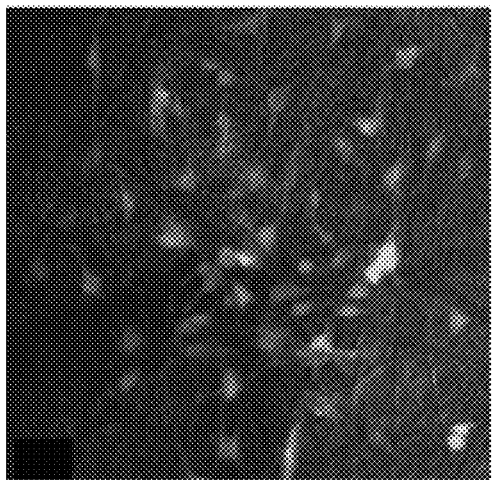
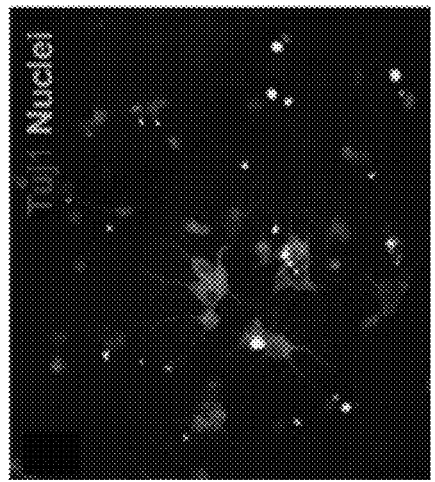
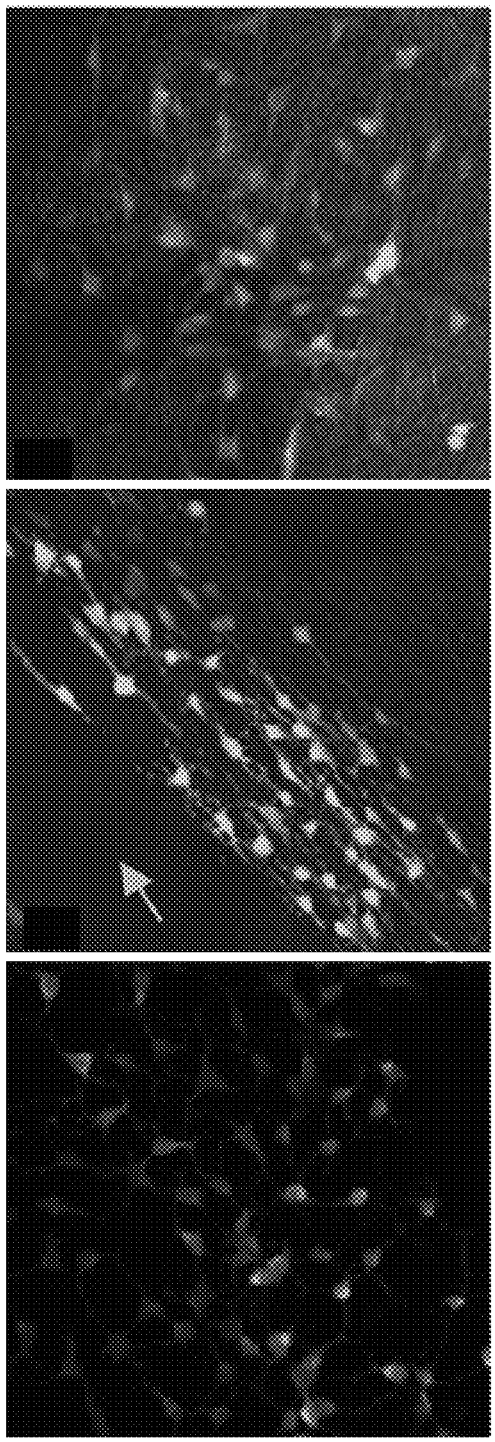
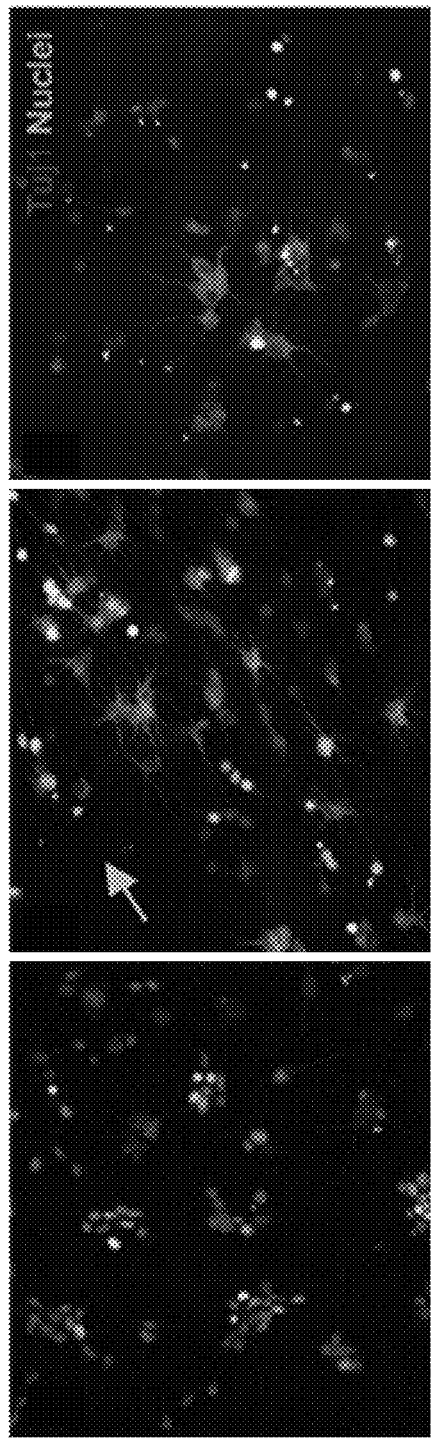
FIGURE 8C  FIGURE 8F
FIGURE 8B  FIGURE 8E
FIGURE 8A  FIGURE 8D

| Number | Angle | Observed count | Total | Bar average | Stdev calc | z scores | expected freq | Expected number | (O-E)²/E |
|---|---|---|---|---|---|---|---|---|---|
| lower than | 0 | 0 | 0 | | 0 | | 0.000 | 0 | 0.005734225 |
| 1 | 16.4 | 0 | 0 | 8.2 | 0 | -4.73 | 0.000 | 0 | 0.019226188 |
| 2 | 32.7 | 0 | 0 | 24.6 | 0 | -3.88 | 0.001 | 0 | 0.000547084 |
| 3 | 49.1 | 2 | 81.855 | 40.9 | 5072.6 | -3.05 | 0.013 | 1 | 0.437229392 |
| 4 | 65.5 | 6 | 345.745 | 57.3 | 6935.3 | -2.19 | 0.076 | 8 | 0.685995281 |
| 5 | 81.8 | 19 | 1399.436 | 73.7 | 5908.6 | -1.34 | 0.221 | 23 | 5.209622904 |
| 6 | 98.2 | 47 | 4330.855 | 90.0 | 73.9 | -0.49 | 0.328 | 34 | 3.463664542 |
| 7 | 114.5 | 16 | 1792.109 | 106.4 | 3644.6 | 0.36 | 0.246 | 25 | 0.009758116 |
| 8 | 130.9 | 10 | 1227.455 | 122.7 | 9895.0 | 1.20 | 0.094 | 10 | 0.674049849 |
| 9 | 147.3 | 3 | 417.327 | 139.1 | 6860.2 | 2.05 | 0.018 | 2 | 0.018140075 |
| 10 | 163.6 | 0 | 0 | 155.5 | 0 | 2.90 | 0.002 | 0 | 0.008982549 |
| 11 | 180.0 | 0 | 0 | 171.8 | 0 | 3.75 | 0.000 | 0 | |
| higher than | | 0 | 0 | 188.2 | 0 | 4.59 | 0.000 | 0 | |
| Total | | 103 | 9403.782 | | 38392.3 | | | $X^2$ | 11.837 |
| Mean | | 9.36 | 91.289 | | 19.306 | | | $X^2_{95,8}$ | 15.203 |
| | | | | $t, x = 90$ | 0.673 | | | $X^2_{99,8}$ | 19.362 |
| | | | | $t_{95}$ | 1.983 | | | p to get in interval | 0.300 |
| | | | | $x < t_{95}$? | TRUE | | | | |

Table S1. *Sample Excel calculation table of statistical analysis of angular distribution of PLA nanofiber formed on a rotating collector, 1050rpm, DCM:DMF solvent.*

FIGURE 13

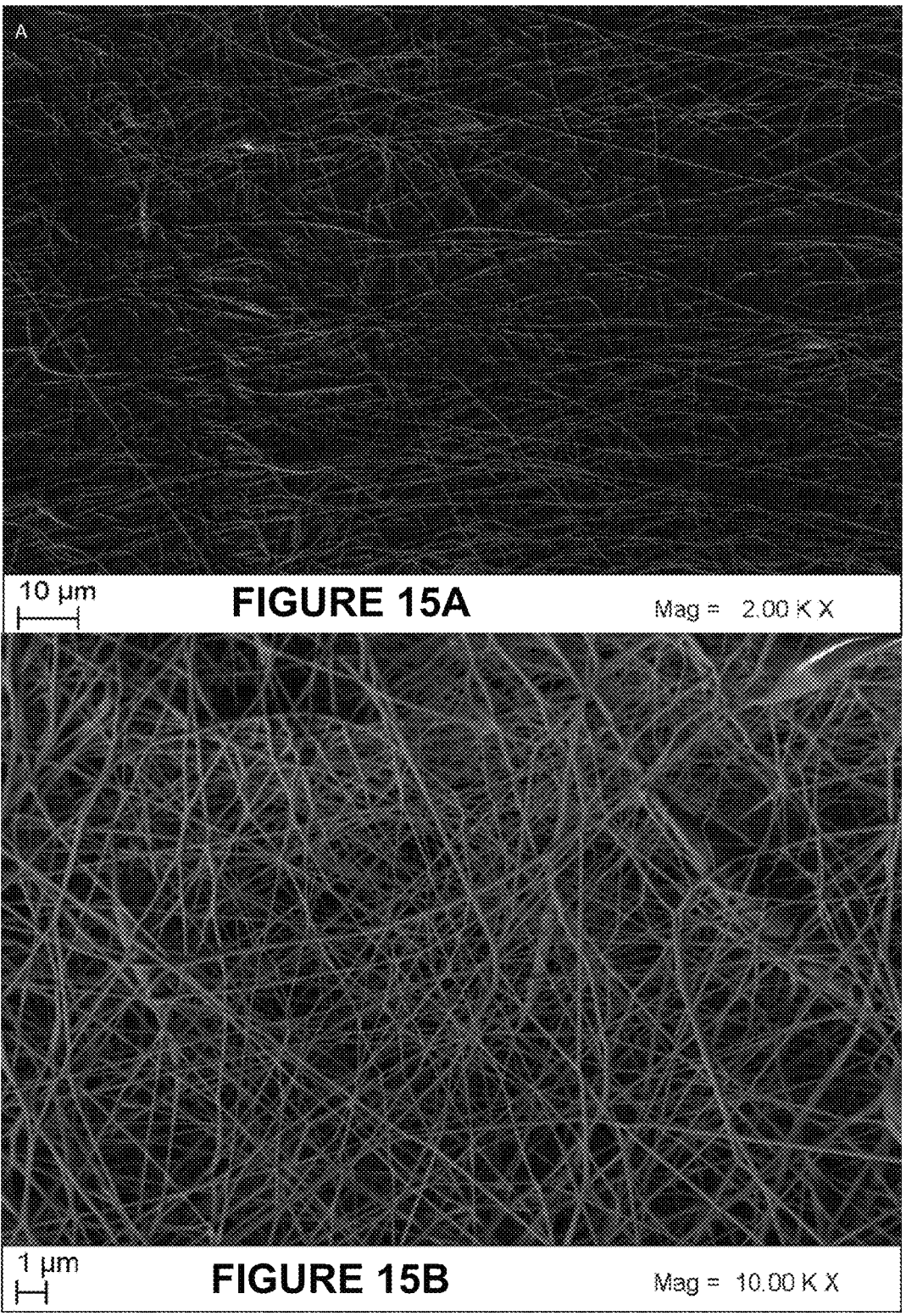

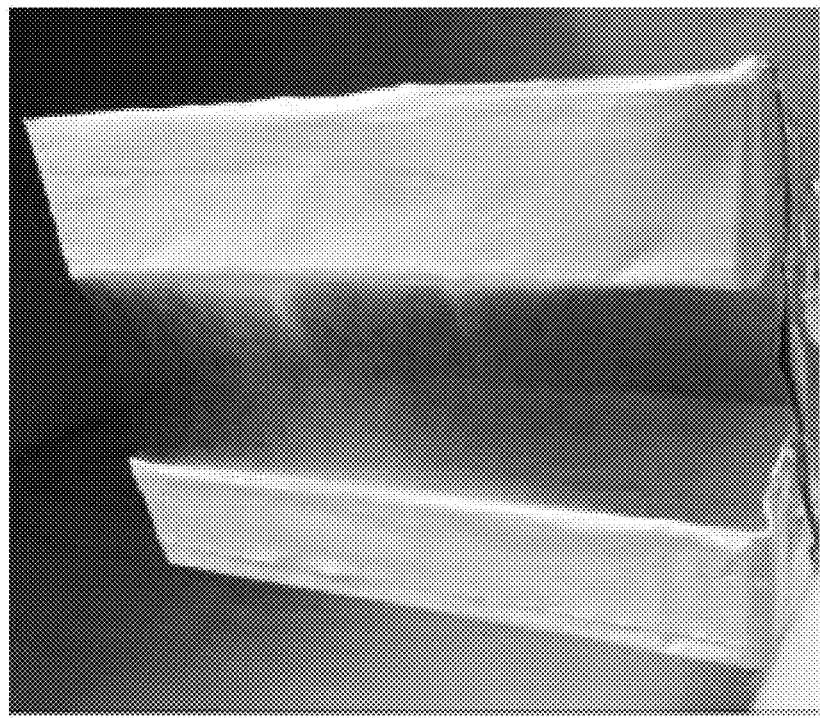
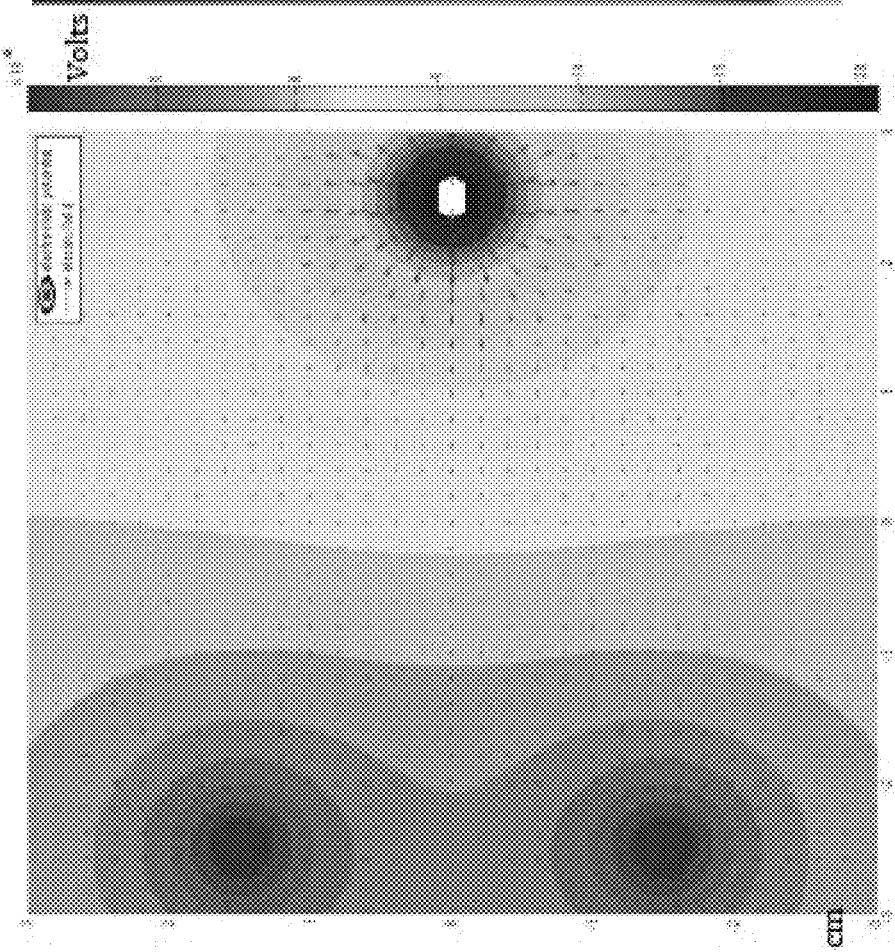
FIGURE 26A
FIGURE 26B

METHODS OF MAKING THREE DIMENSIONAL STRUCTURES HAVING ALIGNED NANOFIBERS AND THE RESULTING STRUCTURES PRODUCED BY SUCH METHODS

§ 0. RELATED APPLICATIONS

This application claims benefit to U.S. Provisional Application Ser. No. 62/271,174, titled "THREE DIMENSIONAL STRUCTURES HAVING ALIGNED NANOFIBERS, METHODS OF MAKING SUCH STRUCTURES, AND APPARATUS FOR MAKING SUCH STRUCTURES," filed on Dec. 22, 2015, and listing Nikita Grigoryev and Kalle Levon as the inventors (referred to as "the '174 provisional" and incorporated herein by reference). The scope of the present invention is not limited to any requirements of the specific embodiments described in '174 provisional.

§ 1. BACKGROUND OF THE INVENTION

§ 1.1 Field of the Invention

The present invention concerns three-dimensional nanofiber structures, such as scaffolds, as well as methods and apparatus for making such three-dimensional nanofiber structures.

§ 1.2 Related Art

The possibility of creating a scaffold that can potentially mimic in vivo nanotopography has been enhanced with the development of nanofibers concept. Creating a fibrous scaffold through various techniques has provided an opportunity to modulate certain properties on the nano scale in hopes to eventually develop optimal conditions for cell growth and tissue engineering. Presently, there are three nanofiber synthesis methods: (1) phase separation; (2) self-assembly; and (3) electrospinning. (See, e.g., the article, Dhandayuthapani B, Yoshida Y, Maekawa T, Kumar D S., "Polymeric Scaffolds in Tissue Engineering Application: A Review," *International Journal of Polymer Science*, 2011; 2011, incorporated herein by reference.) It has been shown that a 3D scaffold designed with the use of electrospinning of biodegradable polymers can provide an exquisite framework for cellular adhesion, growth and proliferation. (See, e.g., the article, Vasita R, Katti D S, "Nanofibers and Their Applications in Tissue Engineering," *International Journal of Nanomedicine*, 2006 March; 1(1): 15-30, incorporated herein by reference.) The use of such fibrous scaffolds has been demonstrated during engineering of such tissues as bone, cartilage, ligament, skeletal muscles, skin, vascular and neural tissues; it has also been used in regulated drug delivery, protein and nucleic acids delivery. (See, e.g., the article, Vasita R, Katti D S, "Nanofibers and Their Applications in Tissue Engineering," *International Journal of Nanomedicine*, 2006 March; 1(1): 15-30, incorporated herein by reference.)

Known electrospinning methods for producing nanofiber scaffolds, and perceived limitations of such known methods, are discussed in § 1.2.1 below. Then, the need for scaffolds in tissue engineering is discussed in § 1.2.2 below.

§ 1.2.1 Known Electrospinning Methods and their Perceived Limitations

Electrospinning is a technique of transforming biodegradable polymeric solutions into nanofiber through application of high voltage; it has shown that control over the fiber diameter as well as fiber alignment can be established through electrospinning. (See, e.g., the article, Vasita R, Katti D S, "Nanofibers and Their Applications in Tissue Engineering," *International Journal of Nanomedicine*, 2006 March; 1(1): 15-30, incorporated herein by reference.) Enhanced alignment of nanofibers achieved by electrospinning, as discussed above, has shown to be able to modulate cellular proliferation and growth behavior with cells aligning in the direction of the fibers. (See, e.g., the article, Teo W E, He W, Ramakrishna S., "Electrospun Scaffold Tailored for Tissue-Specific Extracellular Matrix," *Biotechnology Journal*, 2006; 1(9): 918-929, incorporated herein by reference.) Variations to the technique of electrospinning opened doors to creation of ordered nanofiber scaffolds and thus controlled tissue engineering. (See, e.g., the article, Teo W E, He W, Ramakrishna S., "Electrospun Scaffold Tailored for Tissue-Specific Extracellular Matrix," *Biotechnology Journal*, 2006; 1(9): 918-929, incorporated herein by reference.)

Viscoelastic solutions, such as that of solubilized polymers, respond differently in terms of strain based on the history of applied stress. In electrospinning, electrostatic potential stretches such solution unidirectionally as it solidifies. (See, e.g., the article, Teo W E, Ramakrishna S., "A Review on Electrospinning Design and Nanofibre Assemblies," *Nanotechnolog*, 2006; 17(14): R89, incorporated herein by reference.) Viscoelastic properties allow the polymer solution to be deformed (stretched) under contract stress induced by electrostatics. Drawing of the polymer and its transformation into fiber will continue for as long as there is enough solution to feed the electrospinning jet (See, e.g., the article, Teo W E, Ramakrishna S., "A Review on Electrospinning Design and Nanofibre Assemblies," *Nanotechnolog*, 2006; 17(14): R89, incorporated herein by reference), allowing for continuous fiber formation. A sample horizontal electrospinning setup is shown on FIG. 1.

In the experimental setup the polymer is initially fed through a spinnerete, usually a syringe via the syringe pump. (See, e.g., the article, Teo W E, Ramakrishna S., "A Review on Electrospinning Design and Nanofibre Assemblies," *Nanotechnolog*, 2006; 17(14): R89, incorporated herein by reference.) The pumping rate of the spinnerete is thus directly controlled by the pump settings. The polymer travels to a metal needle to which an electrode is attached. On the other side of the apparatus, there is a collector to which a grounding counter-electrode is attached. A high voltage is applied to the polymeric solution. A liquid droplet is formed on the tip of the needle and becomes subjected to high electric field. When the electrostatic repulsion forces overpower those of surface tension, the droplet erupts, forming what is known as a Taylor cone, a structure discovered before the development of the technique by Sir Ingram Taylor. (See, e.g., the article, Taylor G., *Proceedings of the Royal Society of London A: Mathematical, Physical and Engineering Sciences*, 1964 The Royal Society; 280(1382): 383-397, incorporated herein by reference.) At first, the jet is stable near the tip of the spinneret as still liquid solution is subjected to ohmic flow. As the solvent of the polymer solution evaporates and the jet dries out, it no longer supports ohmic flow, but rather is elongated via convective flow, entering the bending instability whipping step. (See, e.g., the article, Teo W E, Ramakrishna S., "A Review on Electrospinning Design and Nanofibre Assemblies," *Nanotechnolog*, 2006; 17(14): R89, incorporated herein by reference.) It is that whipping instability (FIG. 2) that is responsible for the fiber thinning and elongation, which, in turn, leads to formation of homogeneous fibers on the collector, which is attached to a grounded electrode. (See, e.g., the articles, Li D, Xia Y., Electrospinning Of Nanofibers: Reinventing The Wheel?," *Adv Mater,* 2004; 16(14): 1151-1170, and Teo W E, He W, Ramakrishna S., "Electrospun Scaffold Tailored for Tissue-Specific Extracellular Matrix," *Biotechnology Journal,* 2006; 1(9): 918-929, both incorporated herein by reference.).

As it could be imagined, electrospinning process allows for many parametric variations which all impact the nanotopography of the spun fibers. First of all, the polymer solution itself introduces many variables. Increase in polymer concentration is directly associated with increase in nanofiber diameter. (See, e.g., the article, Theron S A, Zussman E, Yarin A L, "Experimental Investigation of the Governing Parameters in the Electrospinning of Polymer Solutions," *Polymer,* 2004 March; 45(6): 2017-2030, incorporated herein by reference.). Increase in molecular weight of the polymer at the same concentrations increases the nanofiber diameter; the viscosity of solution as well as the surface tension also increases, which was reported to be necessary for the formation of fibers without beads. (See, e.g., the article, Theron S A, Zussman E, Yarin A L, "Experimental Investigation of the Governing Parameters in the Electrospinning of Polymer Solutions," *Polymer,* 2004 March; 45(6): 2017-2030, incorporated herein by reference.). Decreased conductivity of the polymer solution was reported to produce lower fiber diameter due to decreased mass flow rate in the jet. (See, e.g., both the article, Theron S A, Zussman E, Yarin A L, "Experimental Investigation of the Governing Parameters in the Electrospinning of Polymer Solutions," *Polymer,* 2004 March; 45(6): 2017-2030, and the article, Doshi J, Reneker D H, "Electrospinning Process and Applications of Electrospun Fibers," *J Electrostatics,* 1995 August; 35(2-3): 151-160, both incorporated herein by reference.) A solvent, which is used for the polymer solubilization, plays a direct role in overall polymer solution conductivity; pyridine (Pyr), for example, has a conductivity of 12.7 µS/cm at 22.4° C. (See, e.g., the article, Inai R, Kotaki M, Ramakrishna S., "Structure and Properties of Electrospun PLLA Single Nanofibres," *Nanotechnology,* 2005; 16(2): 208, incorporated herein by reference), whereas N,N-Dimethylformamide (DMF) was reported to have an electrical conductance of only 0.9-1.5 µS/cm at 25° C. (See, e.g., the article, Thomas A B, Rochow E G, "Conductance Studies of Organometallic Chlorides of Group IVB and of Hydrogen Chloride in N,N-dimethylformamide. Some Observations About the Purification of the Solvent," *J Am Chem Soc.,* 1957 Apr. 1; 79(8): 1843-1848, incorporated herein by reference.).

The process of electrospinning itself is another source of variables (See, e.g., the article, Doshi J, Reneker D H, "Electrospinning Process and Applications of Electrospun Fibers," *J Electrostatics,* 1995 August; 35(2-3): 151-160, incorporated herein by reference); applied electrostatic potential together with volumetric flow rate affect the charge density. (See, e.g., the article, Theron S A, Zussman E, Yarin A L, "Experimental Investigation of the Governing Parameters in the Electrospinning of Polymer Solutions," *Polymer,* 2004 March; 45(6): 2017-2030, incorporated herein by reference.) Higher flow rate decreases the charge density of the spun polymer eventually resulting in cross linking of some portions of fiber in flight and "garland" formation, while increased volume is associated with increase in charge density. (See, e.g., the article, Theron S A, Zussman E, Yarin A L, "Experimental Investigation of the Governing Parameters in the Electrospinning of Polymer Solutions," *Polymer,* 2004 March; 45(6): 2017-2030, incorporated herein by reference.). At the same time, too high voltage has a great disadvantage; a study reports that an increase in the applied voltage causes increase in the velocity of liquid in the droplet and is associated with faster needle clogging. (See, e.g., the article, Kanjanapongkul K, Wongsasulak S, Yoovidhya T., "Investigation and Prevention of Clogging During Electrospinning of Zein Solution," *J Appl Polym Sci.,* 2010; 118(3): 1821-1829, incorporated herein by reference.). As discussed earlier, bending instability of the jet after solvent evaporation results in looping trajectory or whipping; changing the distance between the spinneret and the collector thus allows for more whipping and, as a result, impacts the nanotopography of the formed mesh. (See, e.g., the article, Reneker D H, Yarin A L, Fong H, Koombhongse S., "Bending Instability of Electrically Charged Liquid Jets of Polymer Solutions in Electrospinning," *J Appl Phys.,* 2000; 87(9): 4531-4547, incorporated herein by reference.) Finally, ambient conditions contribute to the fiber formation; elevated temperatures during spinning, for example, reduce fiber diameter as well as increase in deposition rate. (See, e.g., the article, Doshi J, Reneker D H, "Electrospinning Process and Applications of Electrospun Fibers," *J Electrostatics,* 1995 August; 35(2-3): 151-160, incorporated herein by reference.) Other ambient conditions to consider are air humidity as well the surrounding airflow parameters of the spinning hood. As it can be seen, the electrospinning technique indeed contains a multitude of different variables that can be adjusted to modulate the nanotopography. Several research groups have proposed different methods of modulating collection technique itself to achieve two main goals: enhanced alignment as well as a control over the deposited fiber diameter.

§ 1.2.1.1 Rotating Drum Electrospinning

One of the alterations to the standard static screen collecting method, described earlier, is a rotating drum method. (See, e.g., the article, Matthews J A, Wnek G E, Simpson D G, Bowlin G L, "Electrospinning of Collagen Nanofibers," *Biomacromolecules,* 2002 Mar. 1; 3(2): 232-238, incorporated herein by reference.). There, a counter-electrode is attached to a rotating mandrel that serves as a collector. It was observed that a higher drum rotation speed indeed allowed for induced alignment where 4500 rpm would produce aligned fibers, while a rotation of less than 500 rpm would result in random mesh. (See, e.g., FIG. 3 in the article, Matthews J A, Wnek G E, Simpson D G, Bowlin G L, "Electrospinning of Collagen Nanofibers," *Biomacromolecules,* 2002 Mar. 1; 3(2): 232-238, incorporated herein by reference.). The enhanced alignment, however, was not explained and only qualitative data was provided. While this method allowed for deposition of the fiber over a high surface area, collecting such fiber would still be troublesome and a significantly good alignment would be difficult to achieve due to the fact that at high rotation speeds a breakage would occur. (See, e.g., the articles, Matthews J A, Wnek G E, Simpson D G, Bowlin G L, "Electrospinning of Collagen Nanofibers," *Biomacromolecules,* 2002 Mar. 1; 3(2): 232-238, Doshi J, Reneker D H, "Electrospinning Process and Applications of Electrospun Fibers," J Electrostatics, 1995 8; 35(2-3): 151-160, Teo W E, Ramakrishna S., "A Review on Electrospinning Design and Nanofibre Assemblies," *Nanotechnolog,* 2006; 17(14): R89, all incorporated herein by reference.).

Other research conducted on the study of cellular migration on a fibrous scaffold spun onto a rotating drum managed to produce a mesh with high degree of alignment, but at a cost of very large fiber diameter exceeding 1 µm. (See, e.g., the article, Liu Y, Franco A, Huang L, Gersappe D, Clark R A F, Rafailovich M H, "Control of Cell Migration in Two and Three Dimensions Using Substrate Morphology," *Exp Cell Res,* 2009 Sep. 10; 315(15): 2544-2557, incorporated herein by reference.) Rotation, as one of the factors contributing to alignment, is of a great interest in this research and its effect of nanofiber deposition will be discussed later in greater detail. Alternatively, a rotating screen can be a disc. (See, e.g., the article, Inai R, Kotaki M, Ramakrishna S., "Structure and Properties of Electrospun PLLA Single Nanofibres," *Nanotechnology,* 2005; 16(2): 208, incorporated herein by reference.) This way, with restricted surface area, highly aligned fibers are easily deposited on the collector. Another problem arises now; fiber alignment is achieved only on a relatively small area that is the surface area of the disk's sharp edge. (See, e.g., the articles, Inai R, Kotaki M, Ramakrishna S., "Structure and Properties of Electrospun PLLA Single Nanofibres," *Nanotechnology,* 2005; 16(2): 208, and Teo W E, Ramakrishna S., "A Review on Electrospinning Design and Nanofibre Assemblies," *Nanotechnolog,* 2006; 17(14): R89, both incorporated herein by reference.)

Moreover, nanofiber alignment here is achieved at a rotational speed that produces thin nanofibers; should a higher diameter nanofibers be required, alignment would not be achieved. (See, e.g., the articles, Inai R, Kotaki M, Ramakrishna S., "Structure and Properties of Electrospun PLLA Single Nanofibres," *Nanotechnology,* 2005; 16(2): 208, Doshi J, Reneker D H, "Electrospinning Process and Applications of Electrospun Fibers," *J Electrostatics,* 1995 8; 35(2-3): 151-160, and Teo W E, Ramakrishna S., "A Review on Electrospinning Design an Nanofibre Assemblies," *Nanotechnolog,* 2006; 17(14): R89, all incorporated herein by reference.).

§ 1.2.1.2 Anode Blade Electrospinning

In hopes to develop a method of electrospinning that will allow for not only an easy setup, improved alignment and an easy isolation of the yarn, but a direct control over the nanofiber deposition, another setup has been proposed, this time involving two collecting electrodes. (See, e.g., the article, Teo W E, Kotaki M, Mo X M, Ramakrishna S., "Porous Tubular Structures with Controlled Fibre Orientation Using a Modified Electrospinning Method," *Nanotechnology,* 2005; 16(6): 918, incorporated herein by reference.) In this setup, the needle cathode expels the positively charged jet of polymer solution that meets two sharp bladed anodes separated by a void. As proposed by the research, at first, the positively charged fiber in flight is attracted to the negatively charged blades; later the residual fiber is pulled towards the blade tip by the Coulomb interactions causing a formation of a nearly perfectly aligned fiber (See, e.g. FIG. 4 in the article, Teo W E, Ramakrishna S., "*Electrospun Fibre Bundle Made of Aligned Nanofibres Over Two Fixed Points,*" *Nanotechnology,* 2005; 16(9)) While demonstrating that a two-electrode system is indeed a great way to control nanofiber alignment, it is admitted that fiber formation was limited in area of deposition. (See, e.g., the article, Teo W E, Ramakrishna S., "A Review on Electrospinning Design and Nanofibre Assemblies," *Nanotechnology,* 2006; 17(14): R89, incorporated herein by reference.) The fiber formed in this experiment is a thin yarn of a limited diameter, which might not meet the needs of tissue engineering, where scaffolds of larger surface area are required.

Moreover, that research provides no explanation of electric field and electrostatic potential distribution from the needle to collector electrodes. (See, e.g., the article, Teo W E, Kotaki M, Mo X M, Ramakrishna S., "Porous Tubular Structures with Controlled Fibre Orientation Using a Modified Electrospinning Method," *Nanotechnology,* 2005; 16(6): 918, incorporated herein by reference.) Understanding those properties can provide an insight to the relationship between collecting electrode distance allow for collection of fibers of greater length.

§ 1.2.1.3 Static Electrode Vertical Electrospinning

Even though many other methods have been developed to advance the process of electrospinning, one of the most notable ones and of particular interest for this research also considers the use of two static parallel electrodes. (See, e.g., the article, Li D, Wang Y, Xia Y., "Electrospinning of Polymeric and Ceramic Nanofibers as Uniaxially Aligned Arrays," *Nano Lett.,* 2003 Aug. 1; 3(8): 1167-1171, incorporated herein by reference.) In this experiment of vertical electrospinning, two parallel silicon stripes served as collectors with a void in between them. (See, e.g., the article, Li D, Wang Y, Xia Y., "Electrospinning of Polymeric and Ceramic Nanofibers as Uniaxially Aligned Arrays," *Nano Lett.,* 2003 Aug. 1; 3(8): 1167-1171, incorporated herein by reference.). It is proposed that two forces guide the deposition of the nanofiber between two electrodes; electrostatic force in the direction of electric field and a horizontal Coulomb interaction force (See, e.g., the article, Li D, Wang Y, Xia Y., "Electrospinning of Polymeric and Ceramic Nanofibers as Uniaxially Aligned Arrays," *Nano Lett.,* 2003 Aug. 1; 3(8): 1167-1171, incorporated herein by reference), which elongates the fiber similarly to the previous research. Due to the empty void between the two collecting electrodes, isolation of such fiber indeed becomes much easier than from previous setups. One of the major drawbacks of the design, however, remains a limited length of formed nanofibers; it is admitted that when gap distance exceeded 1 cm the fibers would collapse under their own weight (See, e.g., the article, Li D, Wang Y, Xia Y., "Electrospinning of Polymeric and Ceramic Nanofibers as Uniaxially Aligned Arrays," *Nano Lett.,* 2003 Aug. 1; 3(8): 1167-1171, incorporated herein by reference) that also prevents a deposition of a thicker layer of mesh. (See, e.g., the articles, Doshi J, Reneker D H, "Electrospinning Process and Applications of Electrospun Fibers," *J Electrostatics,* 1995 8; 35(2-3): 151-160, and Teo W E, Ramakrishna S., "A Review on Electrospinning Design and Nanofibre Assemblies," *Nanotechnolog,* 2006; 17(14): R89, both incorporated herein by reference.) In fact, the proposed method does not consider gravitational force acting on the fibers during deposition, which could contribute to their collapse. (See, e.g., the article, Li D, Wang Y, Xia Y., "Electrospinning of Polymeric and Ceramic Nanofibers as Uniaxially Aligned Arrays," *Nano Lett.,* 2003 Aug. 1; 3(8): 1167-1171, incorporated herein by reference.) While electric field distribution is presented, no explanation is provided to the electrostatic field or why a certain distance was chosen between the collector and spinneret. This, again, could explain why the distance between two collecting electrodes is limited.

§ 1.2.2 Need of Scaffolds for Tissue Engineering and Desired Attributes of Such Scaffolds The nanotopography of a tissue engineering scaffold influences differentiation, migration and proliferative patterns of the of the cell culture introduced to it to a great extent. It has been shown that the mechanical stress that cells are subjected to during the cell-substrate interaction in the scaffold, heavily impacts their differentiation behavior and modulates such factors as "growth, morphology, intracellular pH, and collagen and fibronectin synthesis." (The article, Goodman S L, Sims P A, Albrecht R M., "Three-Dimensional Extracellular Matrix Textured Biomaterials." *Biomaterials*. 1996 November; 17(21): 2087-2095, incorporated herein by reference.). For example, early studies (See, e.g., the article, Ingber D E., "Control of Capillary Growth and Differentiation By Extracellular Matrix: Use of a Tensegrity (Tensional Integrity) Mechanism for Signal Processing," *Chest*, 1991 Mar. 1; 99(3_Supplement): 34S-40S, incorporated herein by reference) showed that in vitro models with highly adhesive dishes with dense attachment points (fibronectin in their case) positioning showed a much faster culture growth and differentiation compared to models with sparse attachment point positioning. It was observed that during in vitro angiogenesis, tensile forces from intercellular microfilaments are "exerted on extracellular attachment sites" (See, e.g., the article, Ingber D E., "Control of Capillary Growth and Differentiation By Extracellular Matrix: Use of a Tensegrity (Tensional Integrity) Mechanism for Signal Processing," *Chest*, 1991 Mar. 1; 99(3_Supplement): 34S-40S, incorporated herein by reference) of the ECM as well as intracellularly and impact cellular growth and differentiation and it was argued that adhesive growth environment resisted those forces effectively upregulating cellular proliferation demonstrated in FIG. 5. The mechanical interlocking of the cell/ECM junction was reported to be scaled to 100-1000 nm size. (See, e.g., the article, Goodman S L, Sims P A, Albrecht R M., "Three-Dimensional Extracellular Matrix Textured Biomaterials." *Biomaterials*. 1996 November; 17(21): 2087-2095, incorporated herein by reference.)

Thus, fabricating a scaffold for tissue engineering should take into consideration and accurately simulate the cellular ECM interaction in terms of its mechanochemical properties, which in the proposed design is represented by the nanofiber of controlled diameter and alignment. Nanotopography is observed in the natural ECM, where certain polypeptides and protein, like collagen, exhibit that property, but its in vitro replication has been shown to be very costly and difficult due to dependency on recombinant hosts to gene vectors for those proteins. (See, e.g., the article, Bettinger C J, Kulig K M, Vacanti J P, Langer R, Borenstein J T, "Nanofabricated Collagen-Inspired Synthetic Elastomers for Primary Rat Hepatocyte Culture," *Tissue Engineering. Part A*, 2008 Aug. 26; 15(6): 1321-1329, incorporated herein by reference.). In the proposed design of electrospinning a commercially available PLA was used with total costs of creation an ECM-like environment incomparable to those needed for artificial collagen based ECM scaffold.

Cellular culture growth heavily relies on individual cell migration. Cells can either enzymatically digest the ECM to form a migration trail or deform and "squeeze" to fit into gaps between the ECM. (See, e.g., the article, Friedl P, Wolf K, Lammerding J., "Nuclear Mechanics During Cell Migration," *Curr Opin Cell Biol.*, 2011 February; 23(1): 55-64. PMCID: PMC3073574, incorporated herein by reference.). During normal cellular migration the "adhesive and cytoskeletal dynamics" occur in parallel with proteolysis, where the enzymes are secreted and/or are membrane bound that allows for a localized ECM cleavage. (See, e.g., the article, Wolf K, Müller R, Borgmann S, Bröcker E-, Friedl P., "Amoeboid Shape Change and Contact Guidance: T-Lymphocyte Crawling Through Fibrillar Collagen is Independent of Matrix Remodeling by MMPS And Other Proteases," *Blood*, 2003; 102(9): 3262-3269, incorporated herein by reference.). It should be noted, however, that not all cells perform a focalized ECM digestion. Studies have demonstrated that T cells and other leucocytes, for example, do not exhibit altered migration behavior when subjected to proteolytic inhibitors. (See, e.g., the article, Wolf K, Müller R, Borgmann S, Bröcker E-, Friedl P., "Amoeboid Shape Change and Contact Guidance: T-Lymphocyte Crawling Through Fibrillar Collagen is Independent of Matrix Remodeling by MMPS And Other Proteases," *Blood*, 2003; 102(9): 3262-3269, incorporated herein by reference.) Instead, those cells align themselves stringently in parallel with the surrounding fibrils since such "tracks" allow the least cell-ECM resistance (FIGS. 6A and 6B), lowering the forces that impede the migration. (See, e.g., the article, Wolf K, Müller R, Borgmann S, Bröcker E-, Friedl P., "Amoeboid Shape Change and Contact Guidance: T-Lymphocyte Crawling Through Fibrillar Collagen is Independent of Matrix Remodeling by MMPS And Other Proteases," *Blood*, 2003; 102(9): 3262-3269, incorporated herein by reference.). In vivo such track networks are represented by the collagen fibers that align to create a pathway for lymphocyte trafficking during the inflammation (See, e.g., the article, Wolf K, Müller R, Borgmann S, Bröcker E-, Friedl P., "Amoeboid Shape Change and Contact Guidance: T-Lymphocyte Crawling Through Fibrillar Collagen is Independent of Matrix Remodeling by MMPS And Other Proteases," *Blood*, 2003; 102(9): 3262-3269, incorporated herein by reference), which is independent of the proteolysis. Other cell types, such as various types of stem cells, smooth myocytes, fibroblasts, Schwann cells and neuroblastoma PC12 cells have been demonstrated to align themselves along the nanotopographical lattice followed by sub sequential elongation. (See, e.g., the articles, Bettinger C J, Kulig K M, Vacanti J P, Langer R, Borenstein J T, "Nanofabricated Collagen-Inspired Synthetic Elastomers for Primary Rat Hepatocyte Culture," *Tissue Engineering. Part A*, 2008 Aug. 26; 15(6): 1321-1329, and Teixeira A I, McKie G A, Foley J D, Bertics P J, Nealey P F, Murphy C J, "The Effect of Environmental Factors on the Response of Human Corneal Epithelial Cells to Nanoscale Substrate Topography," *Biomaterials*, 2006 June; 27(21): 3945-3954, both incorporated herein by reference.) As was shown in this research, a created 3 cm mesh exhibited alignment that in the future could be tested for cellular migration patterns.

§ 1.2.2.1 Effect of Nanotopography on Stem Cells

It is well known that a stem cell therapy on the sites of injury is an effective way for new tissue generation. Many biochemical techniques have been developed to predestine stem cells into a certain differentiation pathways, like growth factors, cell-cell interactions and cell-matrix adhesion. (See, e.g., the article, Lim S H, Liu X Y, Song H, Yarema K J, Mao H., "The Effect of Nanofiber-Guided Cell Alignment on the Preferential Differentiation of Neural Stem Cells," *Biomaterials*, 2010 December; 31(34): 9031-9039, incorporated herein by reference.) Application of those methods, however, is usually costly and is complicated in nature. As discussed above, neural regeneration, being highly improbable in vivo, is a highly anticipated area of research in tissue engineering. Subjecting patient's stem cells to a mammalian nerve growth factors (NGF) in hopes to generate a native-like neural tissue is not an option for many research facilities; recombinant mammalian NGF is extremely expensive, and its natural alternative is found in snake's venom in only scarce concentrations of 0.5%. (See, e.g., the article, Osipov A V, Terpinskaya T I, Kryukova E V, Ulaschik V S, Paulovets L V, Petrova E A, Blagun E V, Starkov V G, Utkin Y N, "Nerve Growth Factor from Cobra Venom Inhibits the Growth of Ehrlich Tumor in Mice," *Toxins (Basel)*, 2014 March; 6(3): 784-795. PMCID: PMC3968361, incorporated herein by reference.)

Previously, mesenchymal stem cells' fate has been shown to be successfully modulated by the surrounding substrate stiffness and matrix elasticity. (See, e.g., the articles, Gao L, McBeath R, Chen C S, "Stem Cell Shape Regulates A Chondrogenic Versus Myogenic Fate Through Rac1 And N-Cadherin," *Stem Cells,* 2010; 28(3): 564-572, and Engler A J, Sen S, Sweeney H L, Discher D E, "Matrix Elasticity Directs Stem Cell Lineage Specification," *Cell,* 2015 March; 126(4): 677-689, both incorporated herein by reference.) Those findings suggested that cells indeed are capable of sensing the surrounding mechanical properties and, by adjusting their cytoskeletal components and translating the extracellular mechanical signals into intracellular biochemical pathways (See, e.g., the article, Lim S H, Liu X Y, Song H, Yarema K J, Mao H., "The Effect of Nanofiber-Guided Cell Alignment on the Preferential Differentiation of Neural Stem Cells," *Biomaterials,* 2010 December; 31(34): 9031-9039, incorporated herein by reference); for example γ-tubulin complexes (GTCs) are known to be responsible for the formation of such microtubular organization complexes as Microtubule-Organizing Center (MTOC) and were reported to be spatially oriented in the axial direction of the surrounding substrate nanotopography. (See, e.g., FIG. 7 of the article, Gerecht S, Bettinger C J, Zhang Z, Borenstein J, Vunjak-Novakovic G, Langer R., "The Effect of Actin Disrupting Agents on Contact Guidance of Human Embryonic Stem Cells," *Biomaterials,* 2007 October; 28(28): 4068-4077. PMCID: PMC2257875, incorporated herein by reference.) MTOC polarization, which could be seen as a "morphological manifestation" of contact guidance discussed earlier, was shown to directly impact the proliferative responses of human embryonic stem cells. (See, e.g., the article, Schiebel E., "γ-Tubulin Complexes: Binding to the Centrosome, Regulation and Microtubule Nucleation," *Curr Opin Cell Biol.,* 2000 Feb. 1; 12(1): 113-118, incorporated herein by reference.).

Another exciting discovery has been made in 2010, where the main subject of research was the physical properties of adult neural stem cells' (ANSCs) microenvironment and its influence on differentiation. (See, e.g., the article, Lim S H, Liu X Y, Song H, Yarema K J, Mao H., "The Effect of Nanofiber-Guided Cell Alignment on the Preferential Differentiation of Neural Stem Cells," *Biomaterials,* 2010 December; 31(34): 9031-9039, incorporated herein by reference.) The study evidenced that cellular differentiation could be modulated via the nanotopography of the electrospun nanofibers with diameters of 1/40 to 1/10 of the ANSCs actual size. (See, e.g., the article, Lim S H, Liu X Y, Song H, Yarema K J, Mao H., "The Effect of Nanofiber-Guided Cell Alignment on the Preferential Differentiation of Neural Stem Cells," *Biomaterials,* 2010 December; 31(34): 9031-9039, incorporated herein by reference.) It was found that scaffold fiber alignment indeed stimulated neural differentiation and fibrous topography of even unaligned scaffold would still show lower counts of progenitor cells remaining comparing to the planar scaffold control (FIGS. 8 *d-f*). (See, e.g., the article, Lim S H, Liu X Y, Song H, Yarema K J, Mao H., "The Effect of Nanofiber-Guided Cell Alignment on the Preferential Differentiation of Neural Stem Cells," *Biomaterials,* 2010 December; 31(34): 9031-9039, incorporated herein by reference.) Interestingly, the highest efficiency of pro-neural differentiation modulation was shown to be achieved by the 480 nm aligned fiber scaffold. (See, e.g., the article, Lim S H, Liu X Y, Song H, Yarema K J, Mao H., "The Effect of Nanofiber-Guided Cell Alignment on the Preferential Differentiation of Neural Stem Cells," *Biomaterials,* 2010 December; 31(34): 9031-9039, incorporated herein by reference.)

As it can be concluded, nanotopography, particularly an aligned fibrous scaffold of a certain fiber diameter in nano scale is very promising in terms of its application in tissue engineering. It not only provides proliferation and differentiation cues for stem cells, but could potentially do so without the need for costly growth factors. The developed nanofiber mesh could thus be tested as a scaffold for stem cell culture, where markers for certain differentiation patterns can be investigated as a response to a particular nanotopography of the created scaffold.

§ 1.2.2.2 Effect of Nanotopography on Epithelial Cell Migration

Epithelial cell migration has also been shown to be modulated by cell-biomaterial interaction with nanotopography "track" formation. (See, e.g., the article, Haga H, Irahara C, Kobayashi R, Nakagaki T, Kawabata K., "Collective Movement of Epithelial Cells on a Collagen Gel Substrate," *Biophys J.,* 2005 March; 88(3): 2250-2256. PMCID: PMC1305274, incorporated herein by reference.) Interestingly, during migration cells tend to follow a more directed path as the number of cells increases and cells form migration colonies with "leader" and "follower" cells. (See, e.g., the article, Dent E W, Gertler F B, "Cytoskeletal Dynamics and Transport in Growth Cone Motility and Axon Guidance," *Neuron,* 2003 Oct. 9; 40(2): 209-227, incorporated herein by reference.) Localized alignment of protoplasm is not only important for cellular migration, but was evidenced to be vital for proper differentiation of neurons during the neurogenesis. (See, e.g., the article, Dent E W, Gertler F B, "Cytoskeletal Dynamics and Transport in Growth Cone Motility and Axon Guidance," *Neuron,* 2003 Oct. 9; 40(2): 209-227, incorporated herein by reference.) As it has been shown, while different cell types exhibit different behavior under the influence of the nanotopography of the scaffolding biomaterial, its impact on cell's fate cannot be undermined. It can hence be concluded that a scaffold that exhibits a certain nanotopography with enhanced alignment will simulate the in vivo conditions and allow for heightened cellular migration of certain cell types and modulates the differentiation patterns of the others, which rises the need to develop a scaffold that not only is able to be exhibit a certain topography of nano scale, but be able to adopt alignment as well as be biodegradable, induce minimal immune inflammatory response and not be cytotoxic. The developed scaffold from this research has been created with a biodegradable PLA, but should be further tested for toxicity.

§ 1.3 Unmet Needs

As it can be seen, novel methods of electrospinning face two major problems: creation of a highly aligned fibrous scaffold is either possible with (1) a limited length, or (2) at a cost of a relatively large fiber diameter. It would be useful to provide a method of electrospinning that allows for creation of a thin, highly aligned, nanofiber, with a mesh length exceeding that of previously proposed methods. Such a highly aligned fibrous scaffold could be used to test proliferative patterns of cell lines that were shown to respond to nanotopography, such as PC12 for example. The same scaffold could be used to test the differentiate patterns of stem cell line and test for presence of the markers corresponding to a certain cell type. Finally the fiber could be used with cells that rely on ECM nanotopography for migration, such as lymphocytes for example.

§ 2. SUMMARY OF THE INVENTION

In the experiments conducted in this work, an alternative method of electrospinning is presented. First, the parallel electrode is transformed to a horizontal apparatus where a collector is a single folded aluminum foil in a way to expose two parallel collectors with equal charge distribution. Finally, a novel method of rotating two-electrode system is developed, which introduces rotational force to the fiber deposition and allows for more linear nanofiber formation.

Example embodiments of the present invention are described herein. The present invention is not limited to the example embodiments. Rather, the inventors regard their invention as any method, apparatus, product, or any other statutory subject matter described herein, and any equivalents.

§ 3. BRIEF DESCRIPTION OF THE DRAWINGS

FIG. 5 illustrates the impact of ECM attachment points on cell culture growth.

Figure 1:
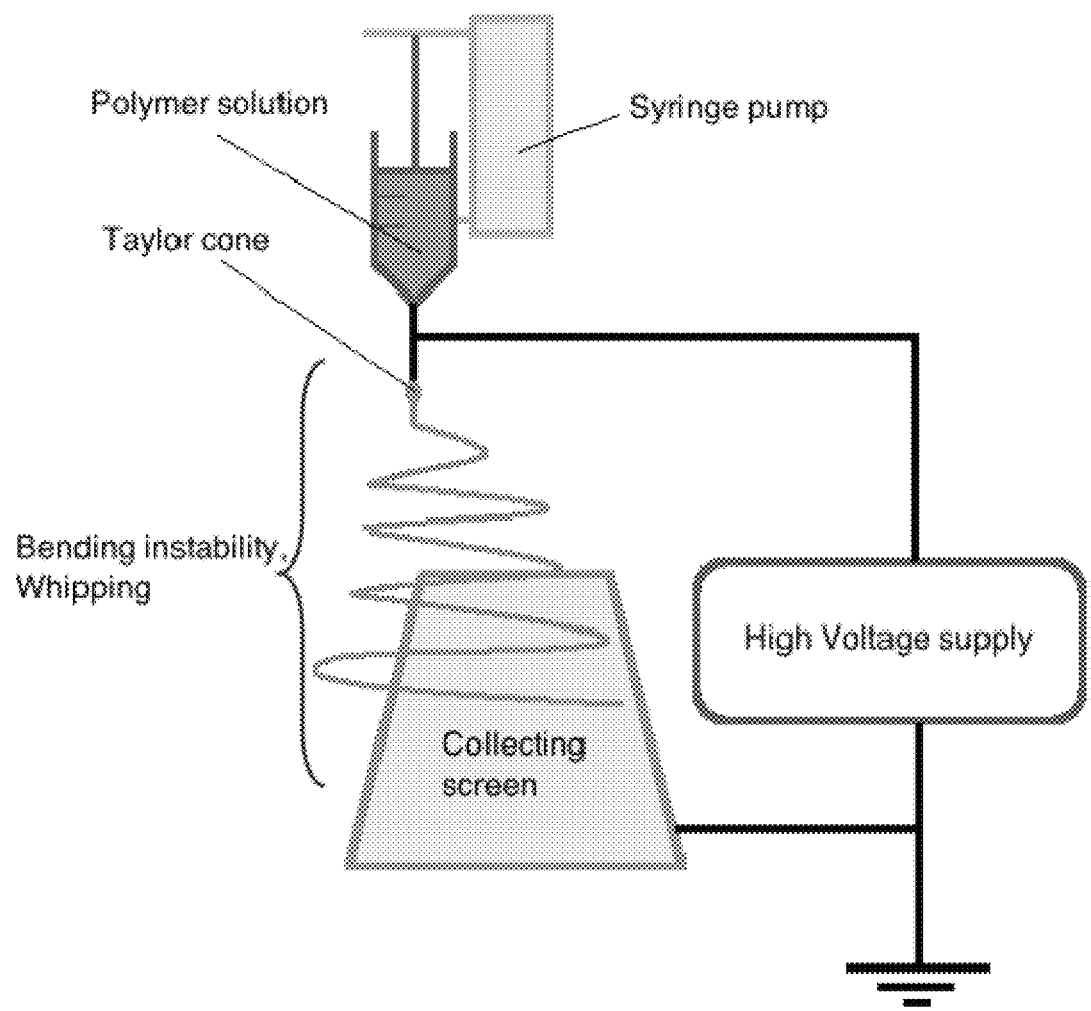
FIG. 1 is a diagram illustrating a sample horizontal electrospinning apparatus setup.
Figure 2:
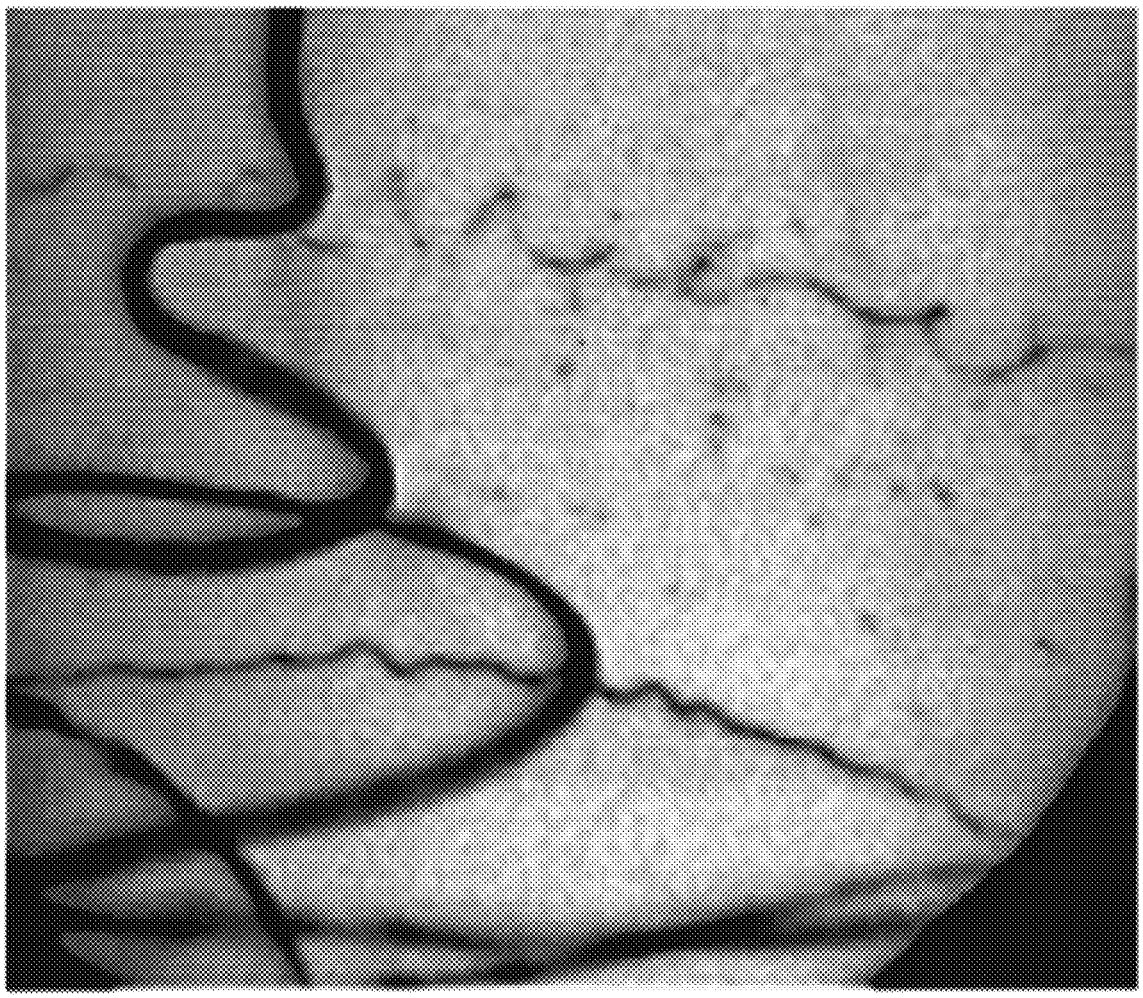
FIG. 2 is a microphotograph illustrating electrospinning with bending instability at the end of the mesh, 0.25 ms exposure. (From: Reneker et al., 2000; Journal of Applied Physics: 87 (9).)
Figure 3:
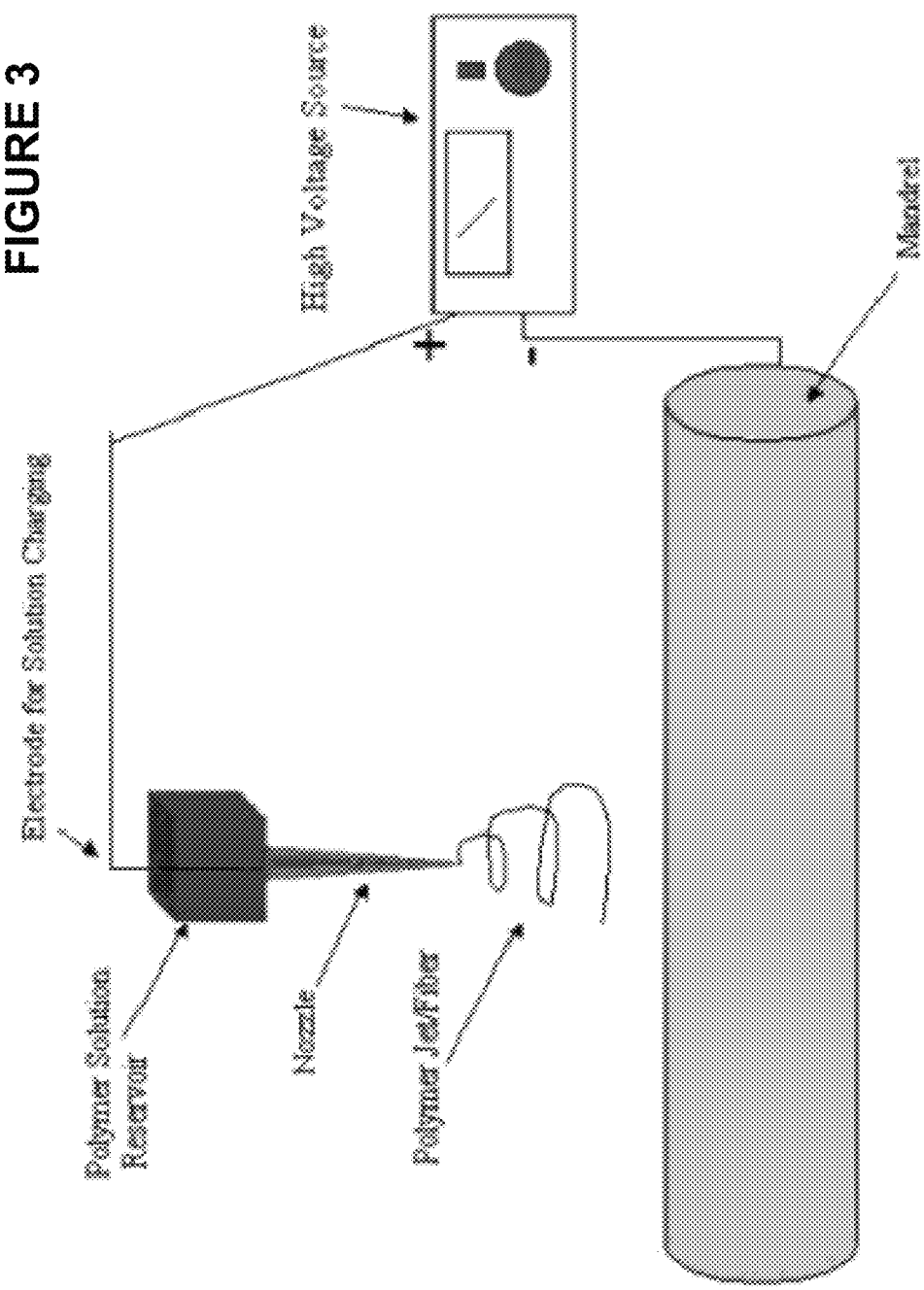
FIG. 3 is a diagram illustrating an electrospinning setup used for rotating mandrel collector. (From: Matthews et al., 2002; Biomacromolecules (3).)
Figure 4:
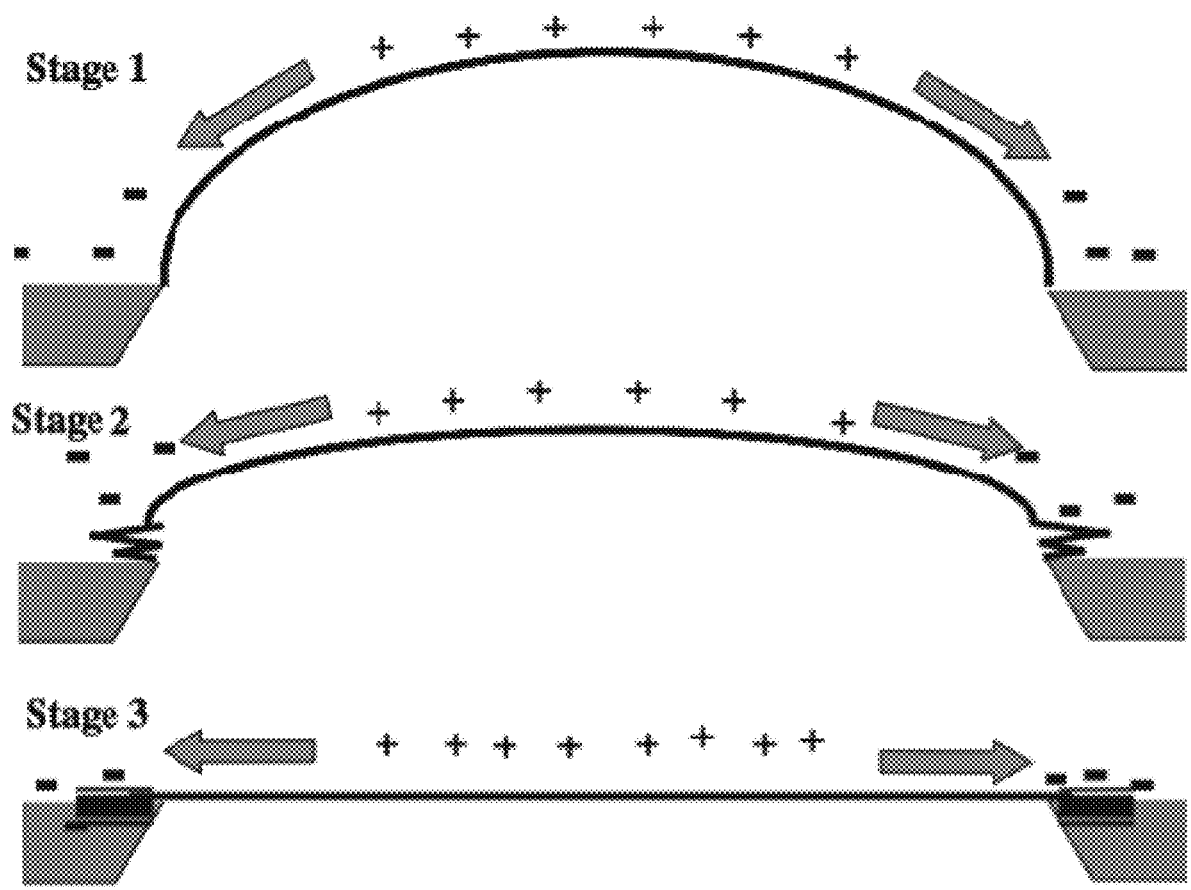
FIG. 4 illustrates the elongation of an electrospun nanofiber during deposition on two anode blades. (From: Teo et al., 2005; Nanotechnology: 16(9).)
Figure 6B:
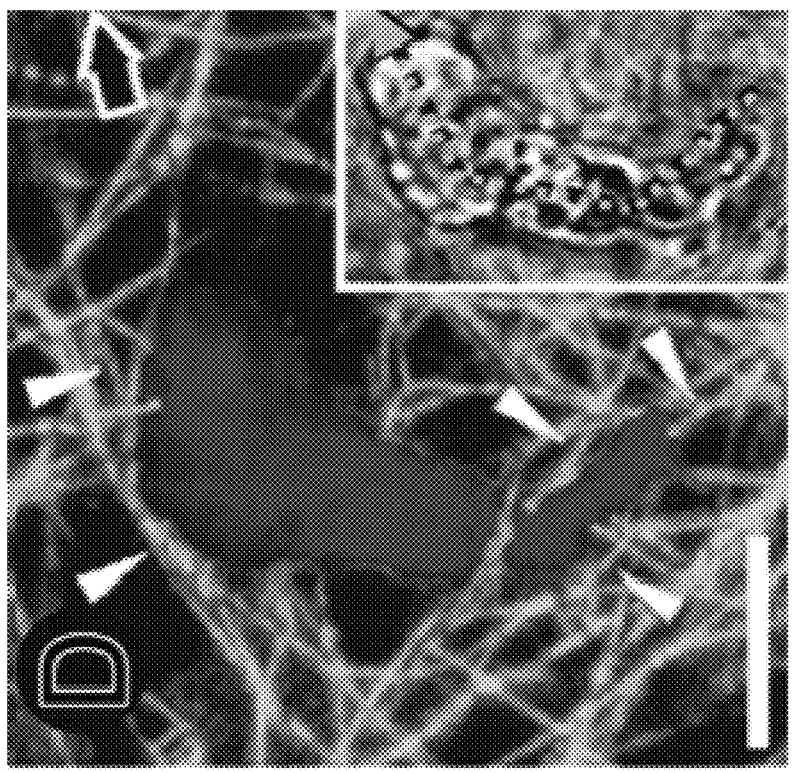
FIG. 6B illustrates change of angle of migration according to the matrix. (From: Woolf et al, 2003; Blood: 102 (9).)
Figure 6A:
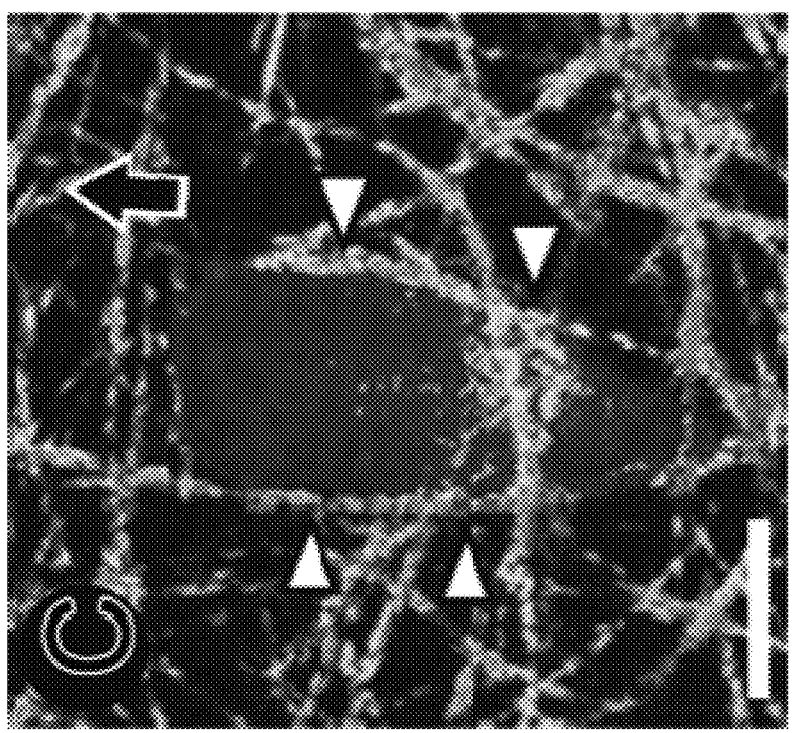
FIG. 6A illustrates Lymphocyte alignment in parallel to matrix.
Figure 7:
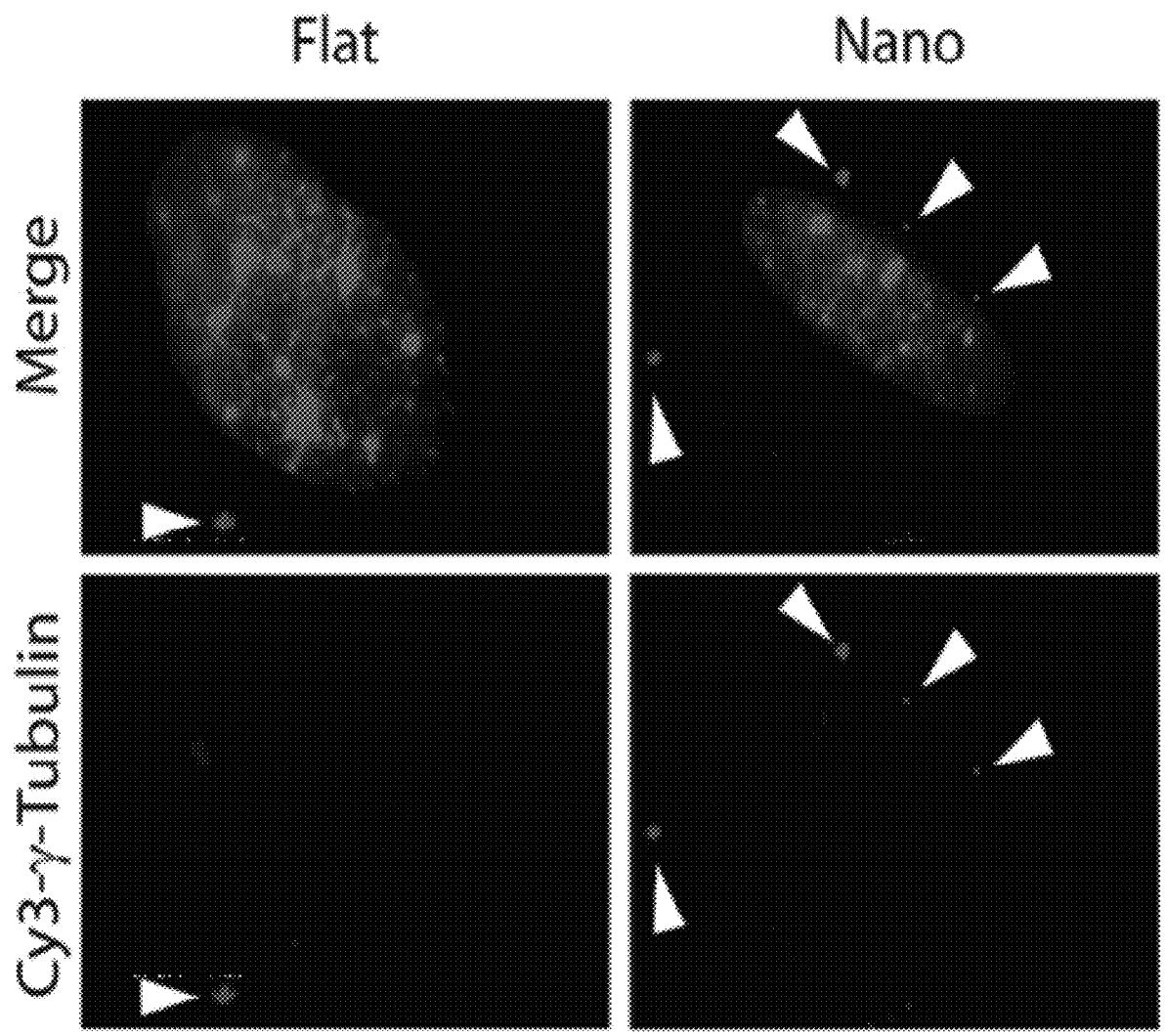

FIG. 7 are microphotographs illustrating the effect of scaffold nanotopography on GTS complex polarization (in red with white arrowheads pointing) in hESCs. It should be noted that flat substrate resulted in radial distribution of γ-tubulin, longitudinally. Aligned nanotopography resulted in more polarized GTS. (From: Gerecht et al, 2007; Biomaterials: 28 (28).)

FIGS. 8A-8F are fluorescent microphotographs of ANSCs on planar surface (FIGS. 8A and 8D), aligned fibrous electrospun 480 nm scaffold (FIGS. 8B and 8E) and random fibrous scaffold (FIGS. 8C and 8F). Neural differentiation patterns were investigated after 5 days, labeling with anti-Tuj 1 antibodies. Note increased neuron proliferation patterns on aligned scaffold (FIG. 8E). (From: Lim et al, 2010; Biomaterials: 34 (32).)

Figure 9:
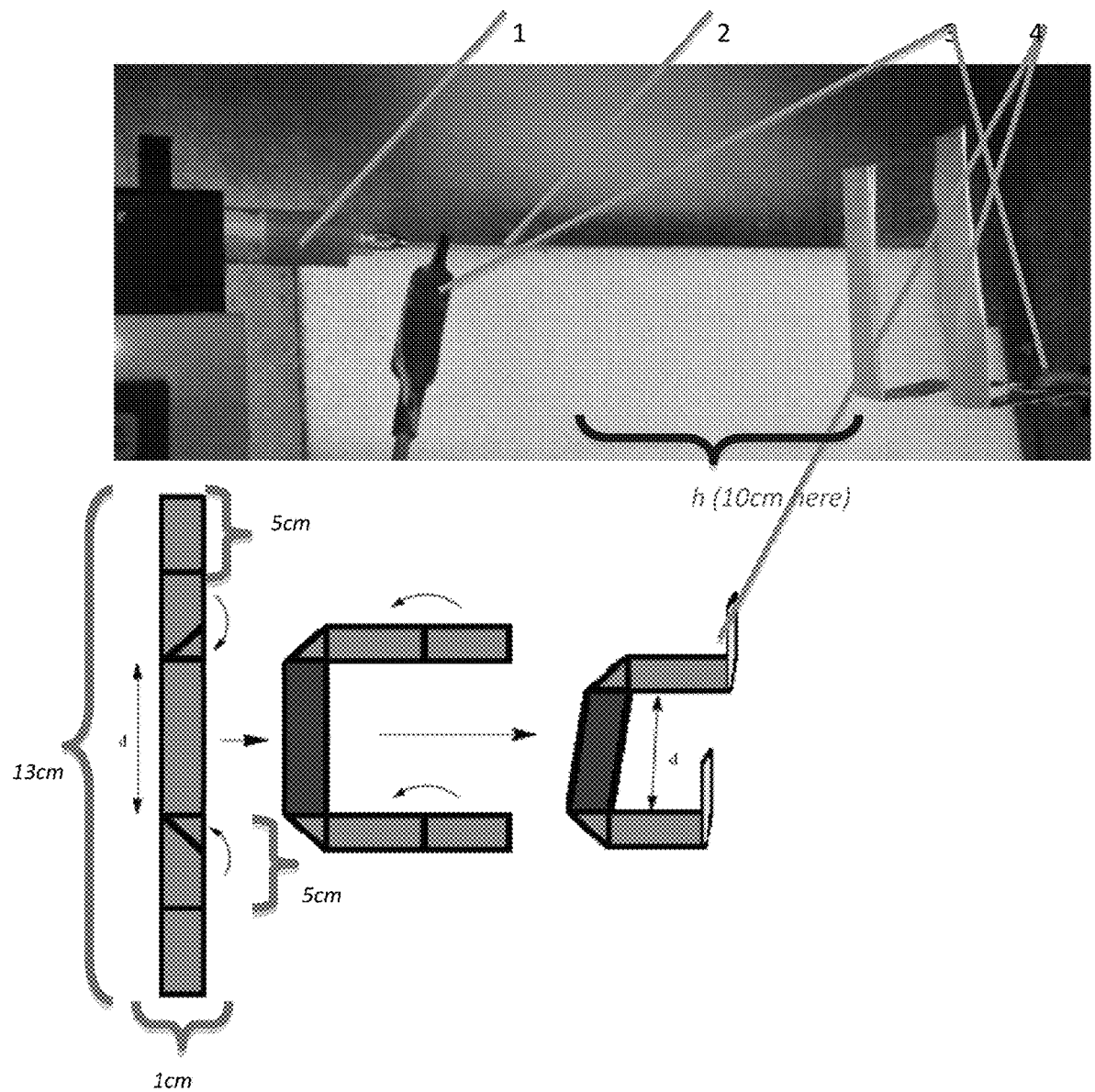

FIG. 9 is a diagram illustrating a single piece two-electrode collector electrospinning apparatus setup and folding demonstration.

Figure 10:
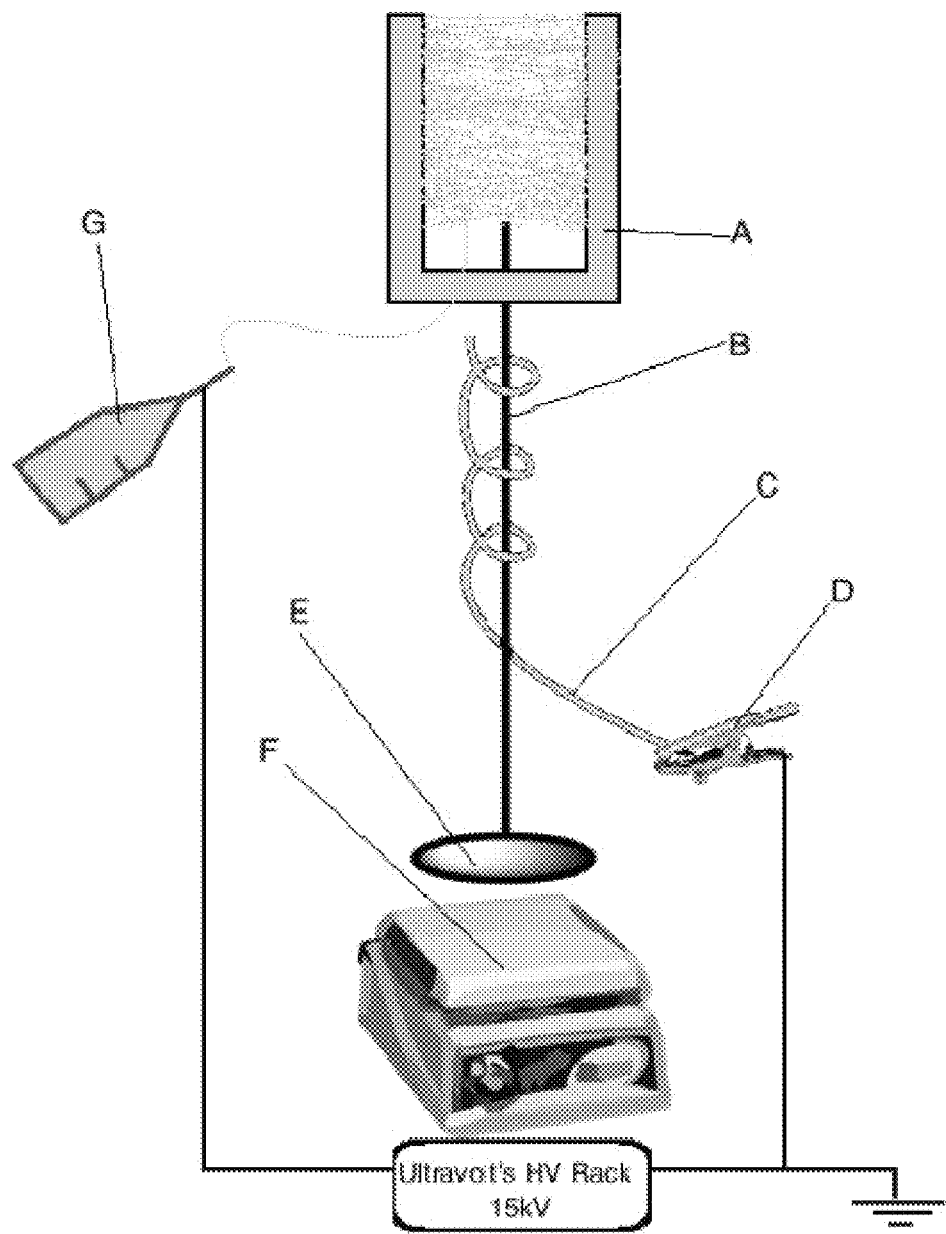

FIG. 10 is a diagram illustrating a rotating spindle electrospinning system.

Figure 11:
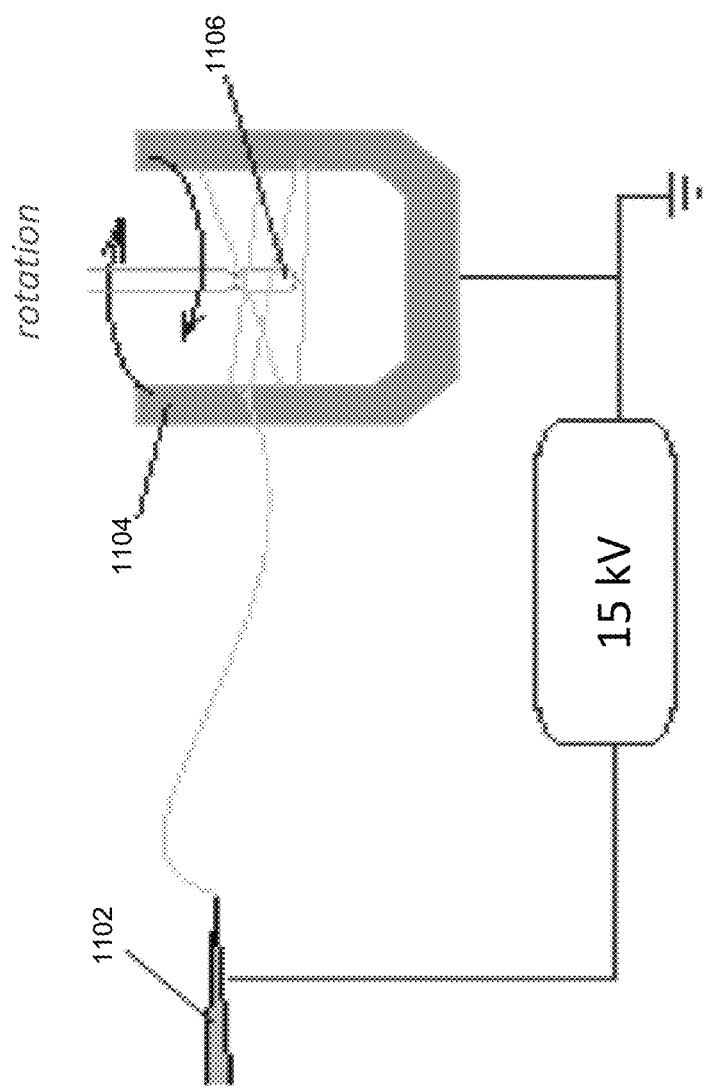

FIG. 11 is a diagram illustrating a system for coating an object during electrospinning weaving.

Figure 12:
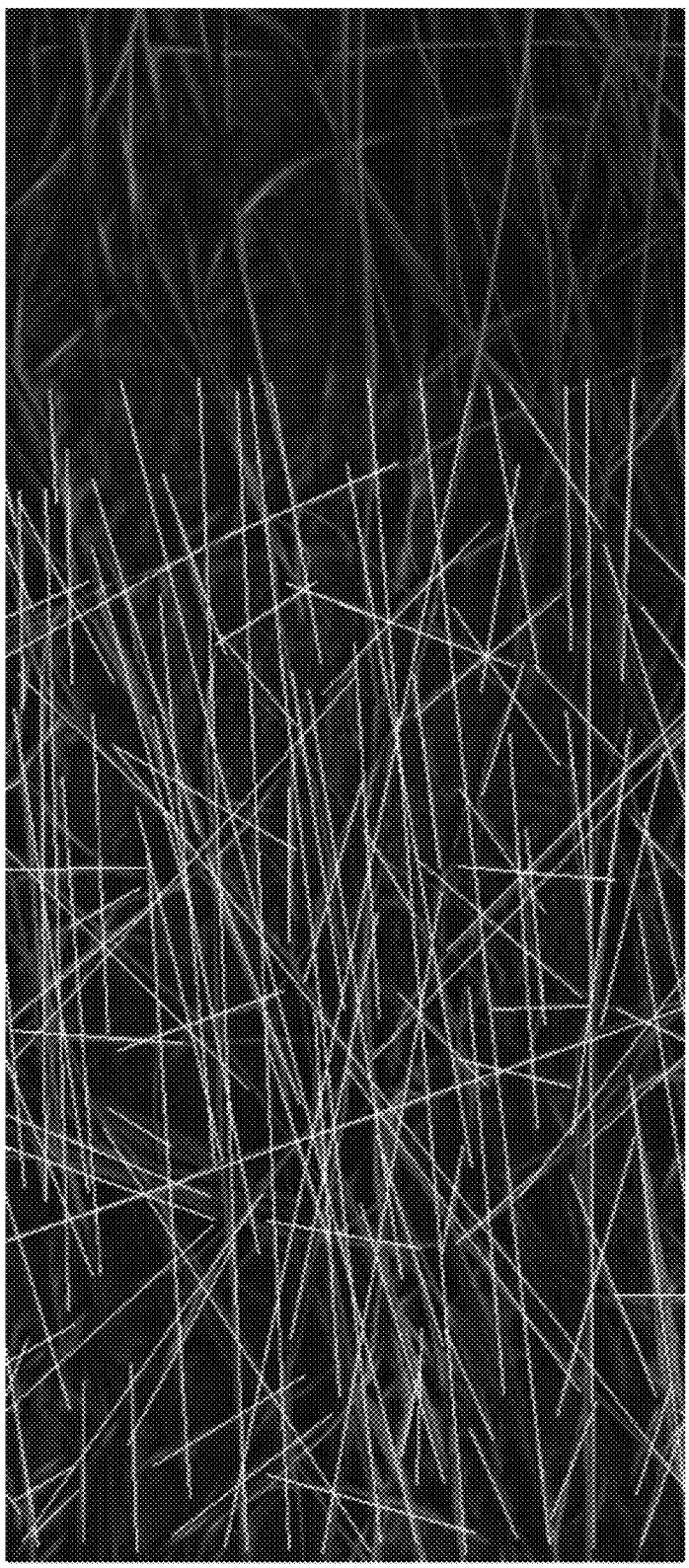

FIG. 12 illustrates traces of every visible line over the individual nanofibers on the presented SEM microscopy image, which was used with ImageJ software to analyze the nanofiber.

FIG. 13 is a table including data related to an angular output of the traced lines.

Figures 14A, 14B:
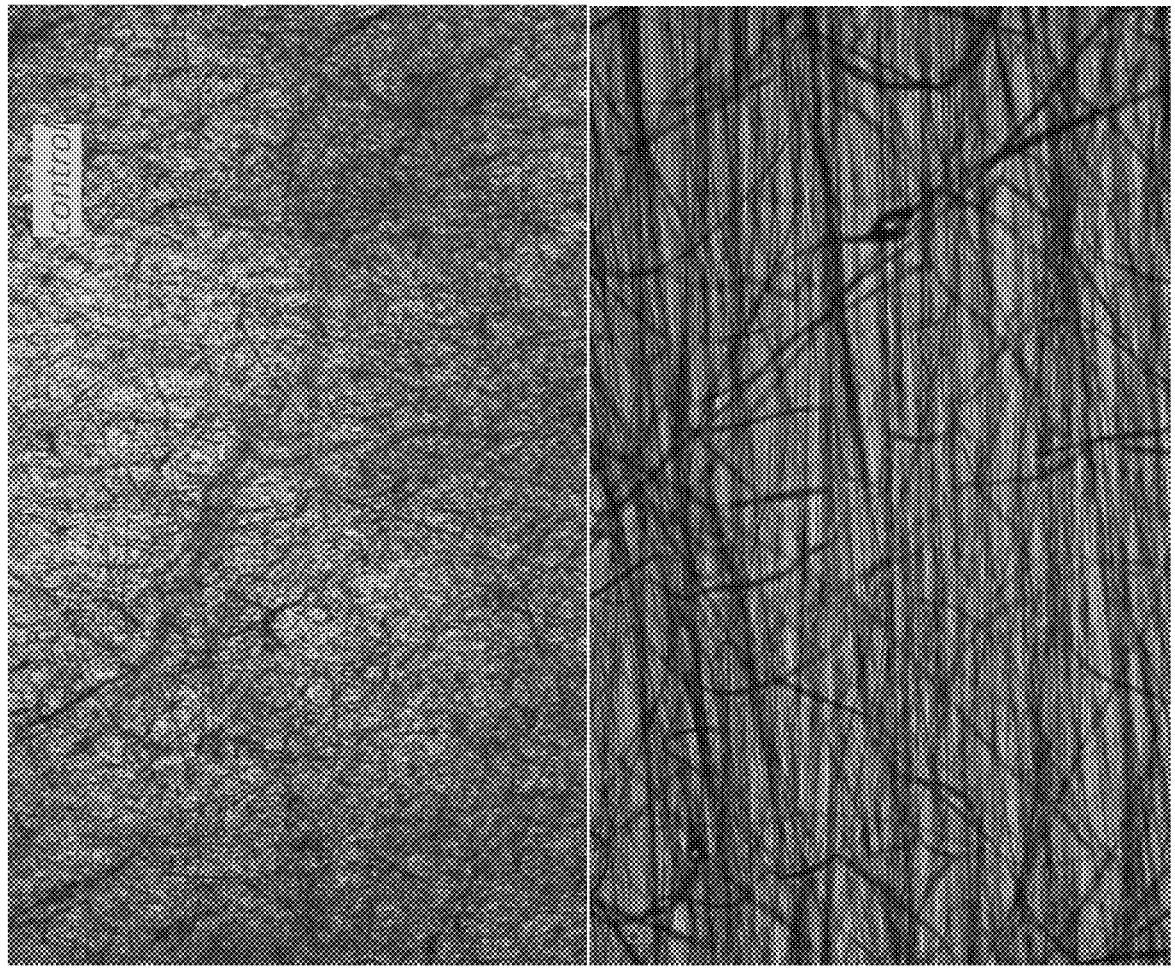

FIGS. 14A and 14B are bright-field microscopy photographs of electrospun PLA nanofiber (7.5% w/w), with solvent DCM:DMF. FIG. 14A is the result when using a control static screen collector at 400×. FIG. 14B is the result when using a rotating dual electrode collector at 1050 rpm and 1000×.

FIGS. 15A and 15B are SEM microscopy photographs depicting the alignment of PLA nanofibers during deposition onto a rotating dual electrode collector at 1050 rpm (at 2000×) and a static screen negative control (at 10,000×), respectively.

Figure 16:
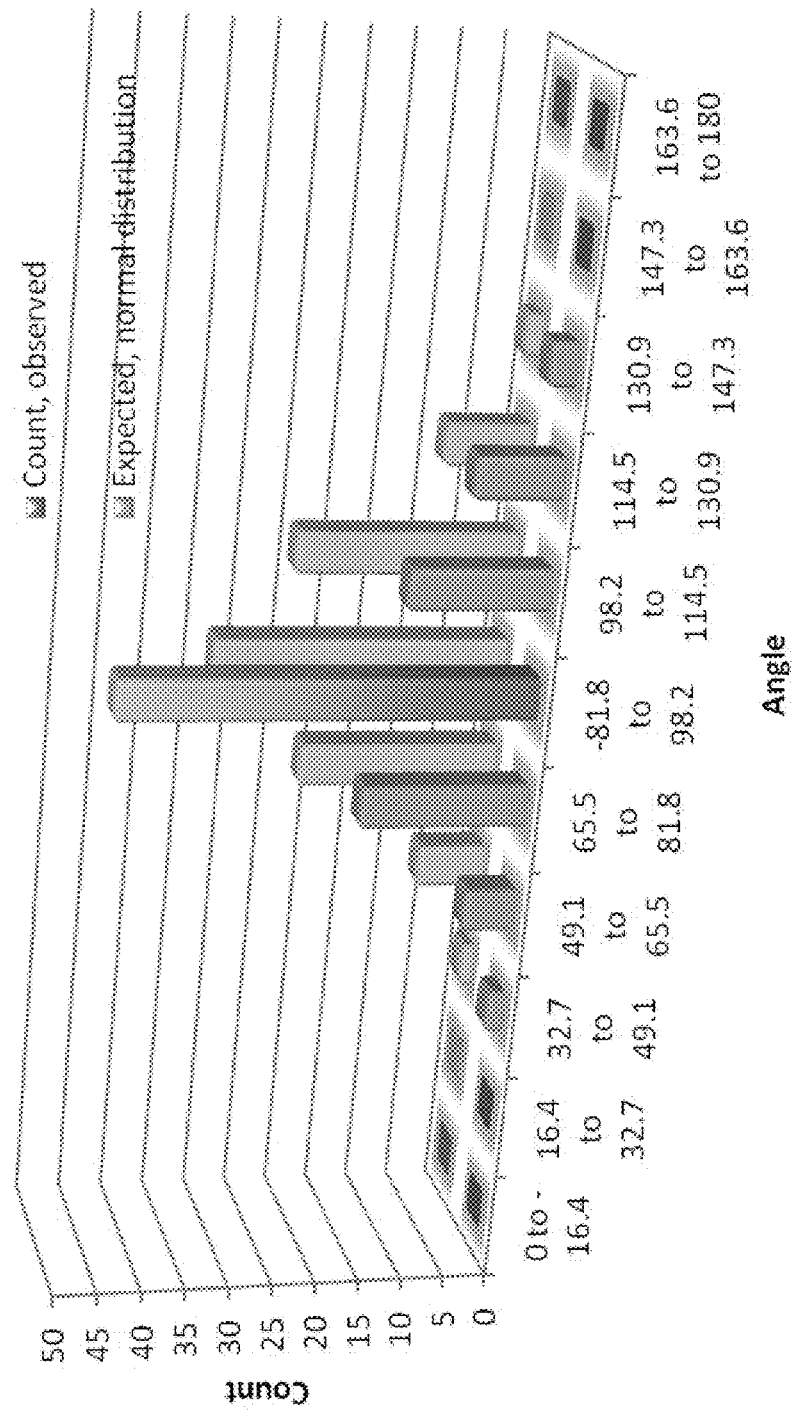

FIG. 16 is a plot depicting an angular distribution of nanofiber deposited on rotating collector, 1050 rpm.

Figure 17:
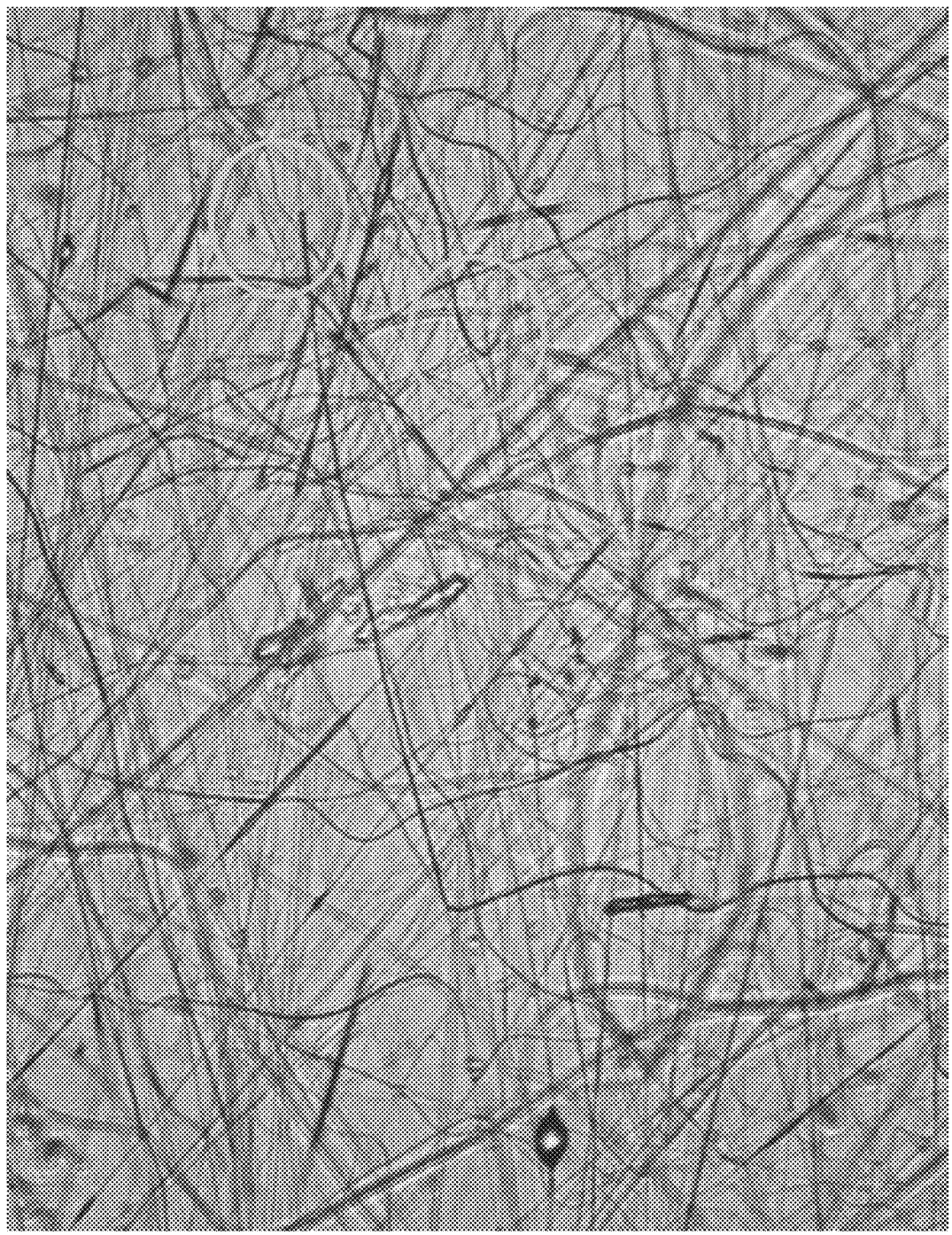

FIG. 17 is a bright-field microscopy photograph at 1000×.

Figure 18:
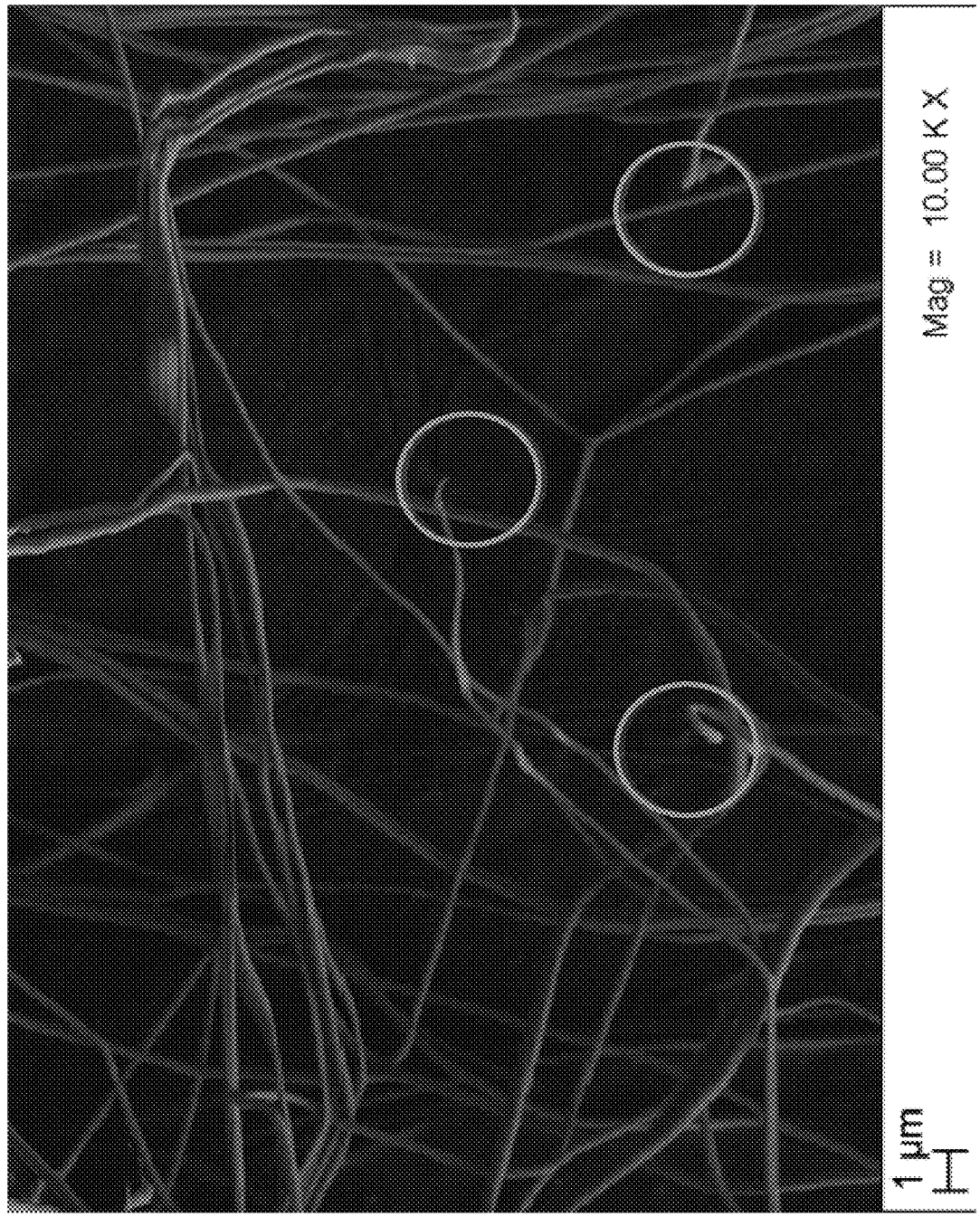

FIG. 18 is a SEM microscopy photograph depicting the severance of nanofibers during their deposition on a fast rotating (1350 rpm) collector.

Figure 19:
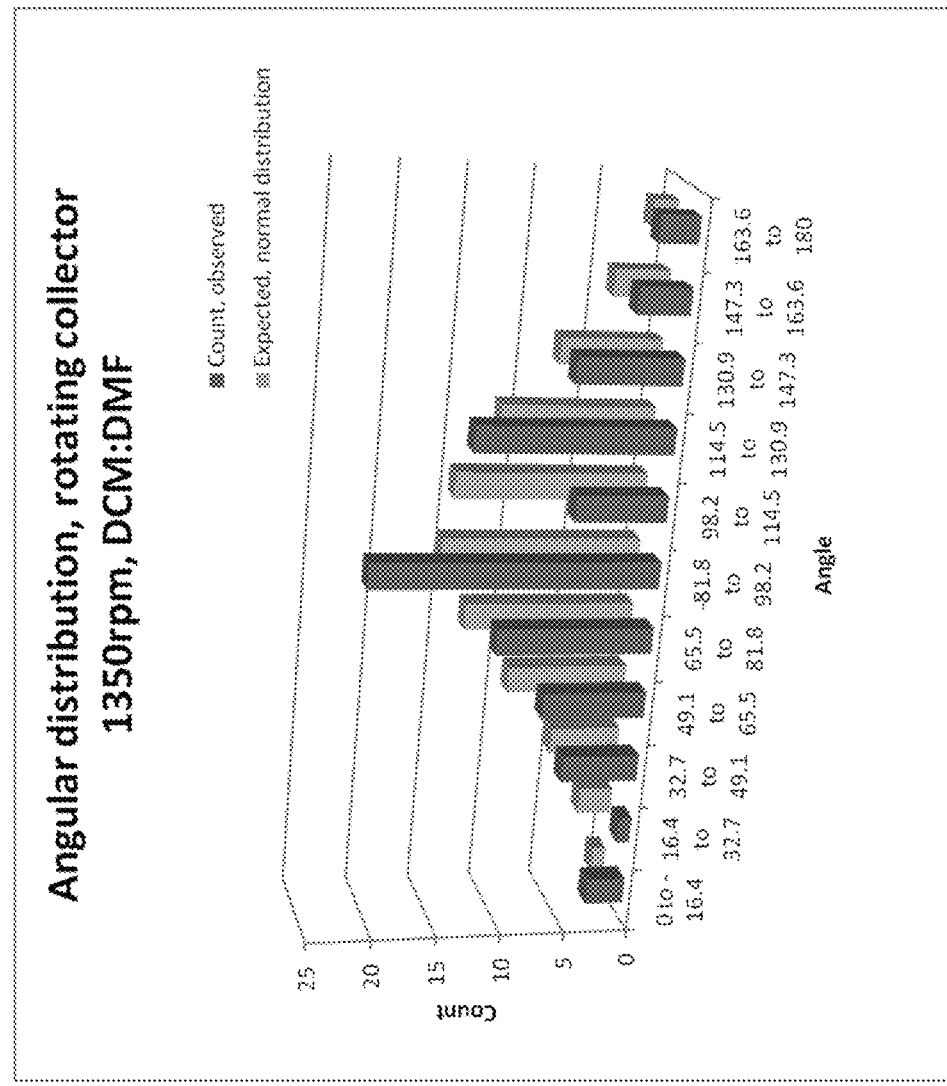

FIG. 19 is a plot depicting an angular distribution of nanofiber deposited on rotating collector, 1050 rpm.

Figure 20:
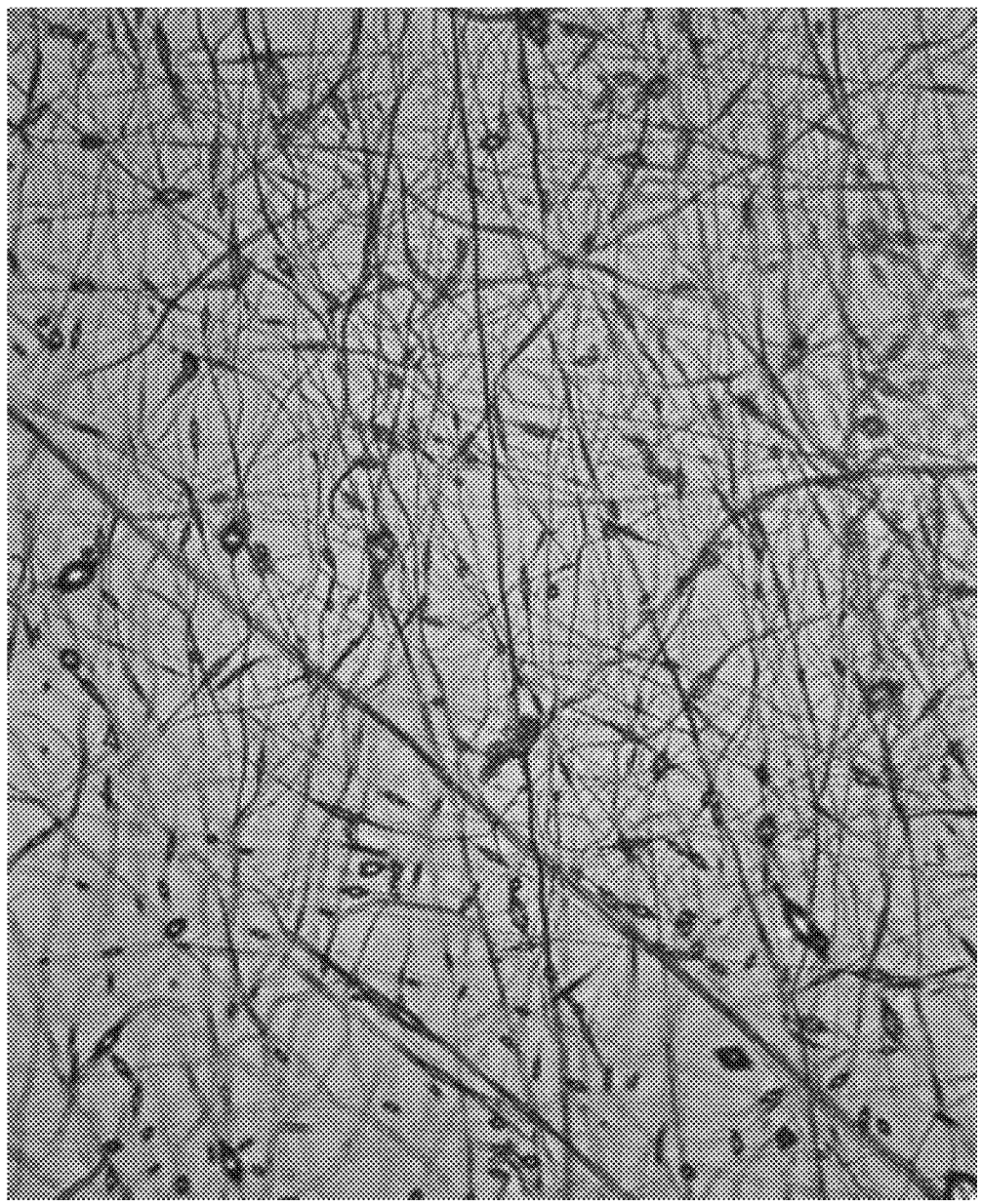

FIG. 20 is a bright-field microscopy photograph of the PLA nanofiber at 400×, when DCM:pyr is used as a solvent and the collector rotation is 1050 rpm.

Figure 21:
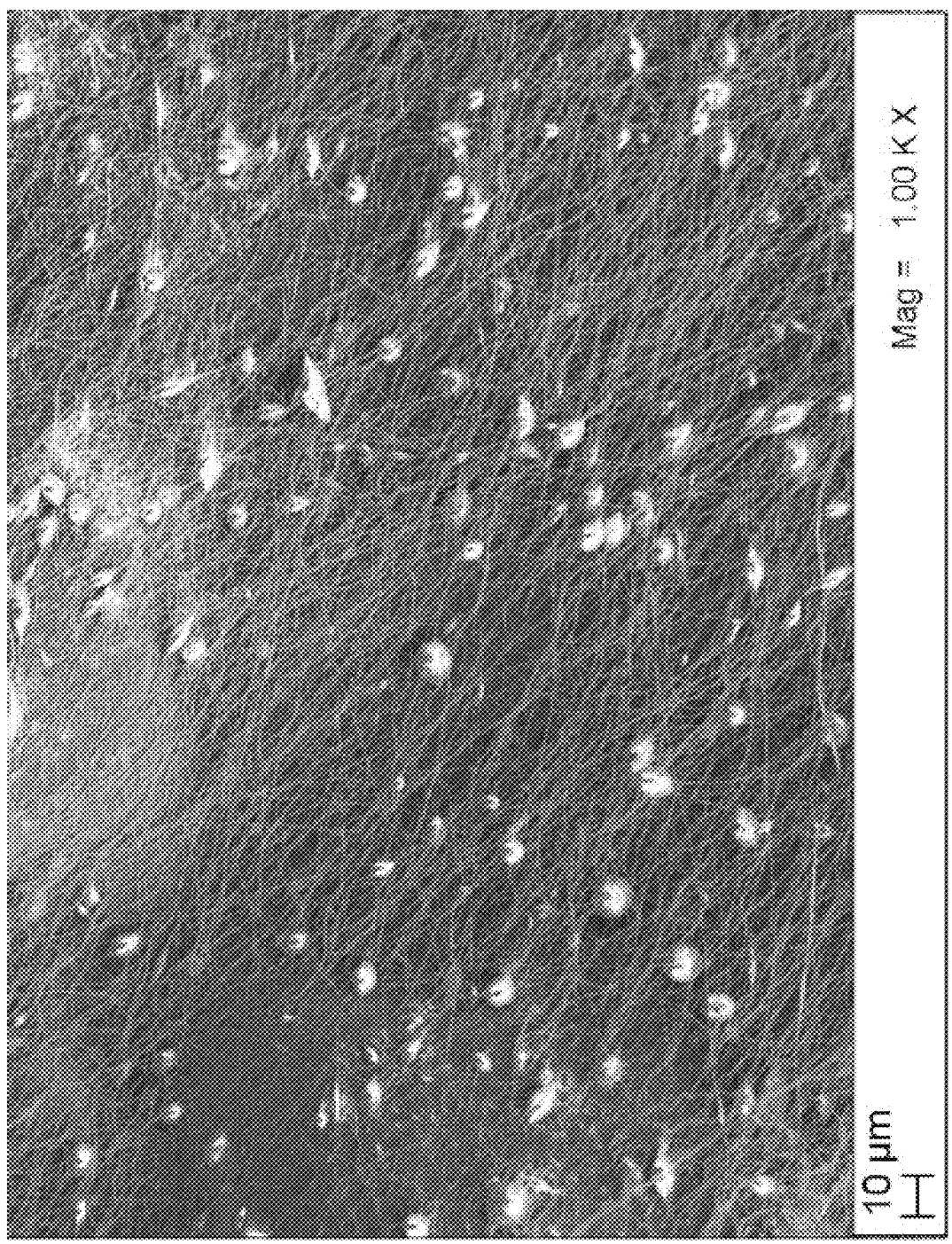

FIG. 21 is a SEM microscopy photograph of the PLA nanofiber at 1000×, when DCM:pyr is used as a solvent and the collector rotation is 1050 rpm.

Figure 22:
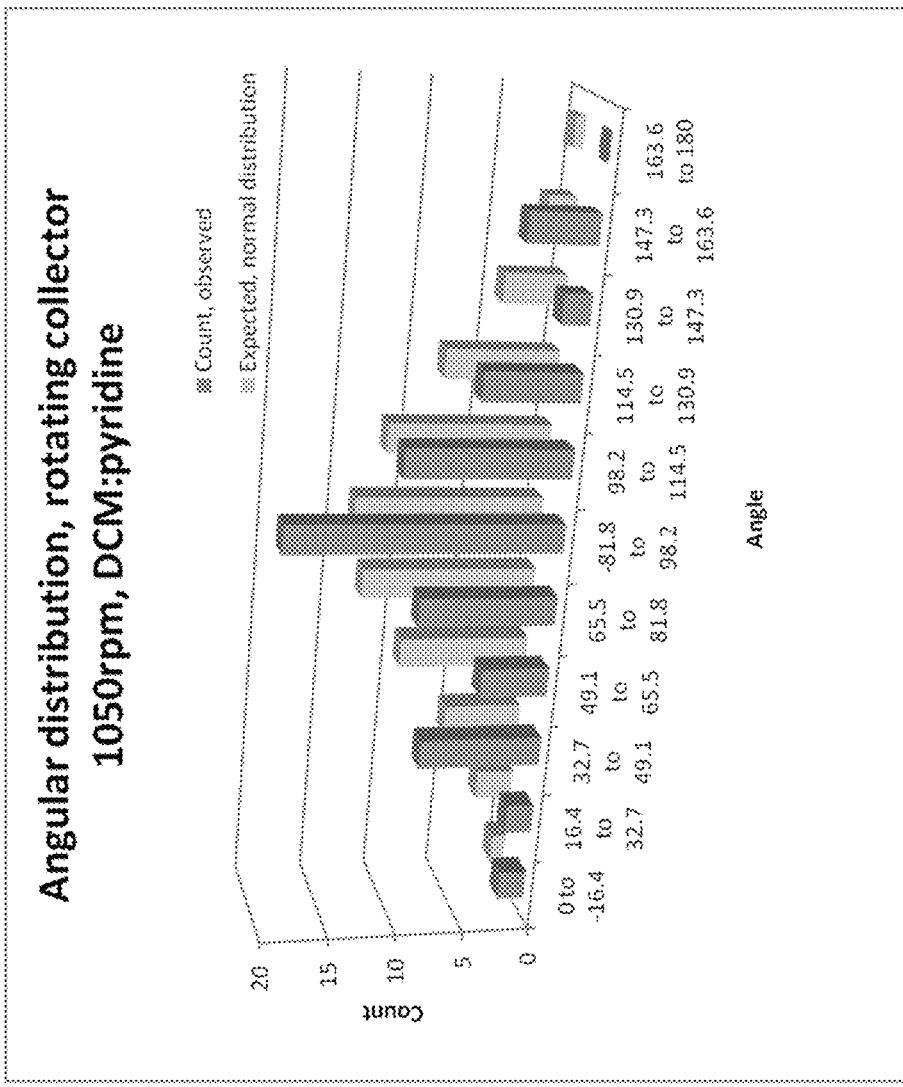

FIG. 22 is a plot depicting an angular distribution of nanofiber deposited on rotating collector, 1050 rpm.

Figure 23:
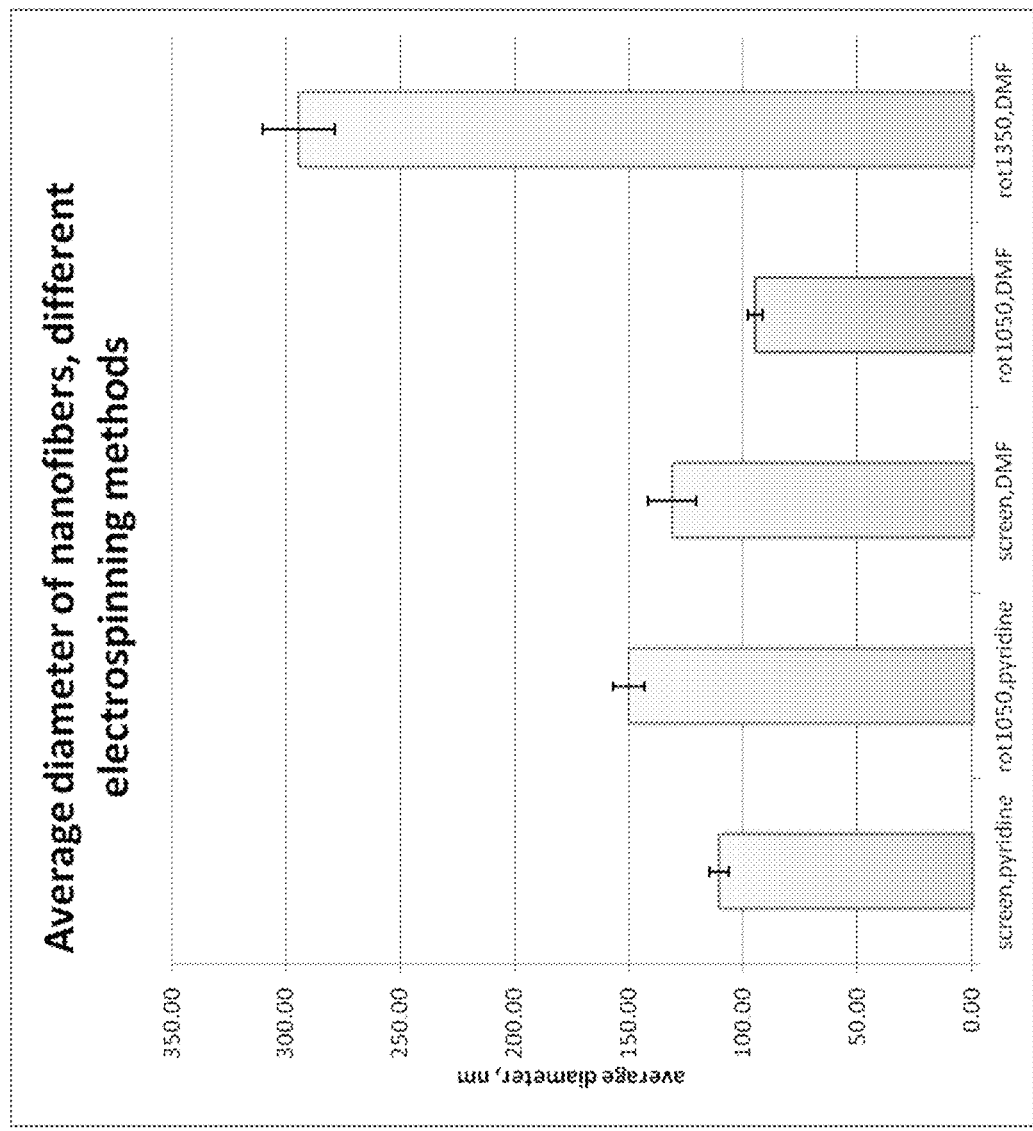

FIG. 23 summarizes is a table summarizing diametric measurement data corresponding to nanofibers made with different electrospinning methods and/or parameters.

Figure 24B:
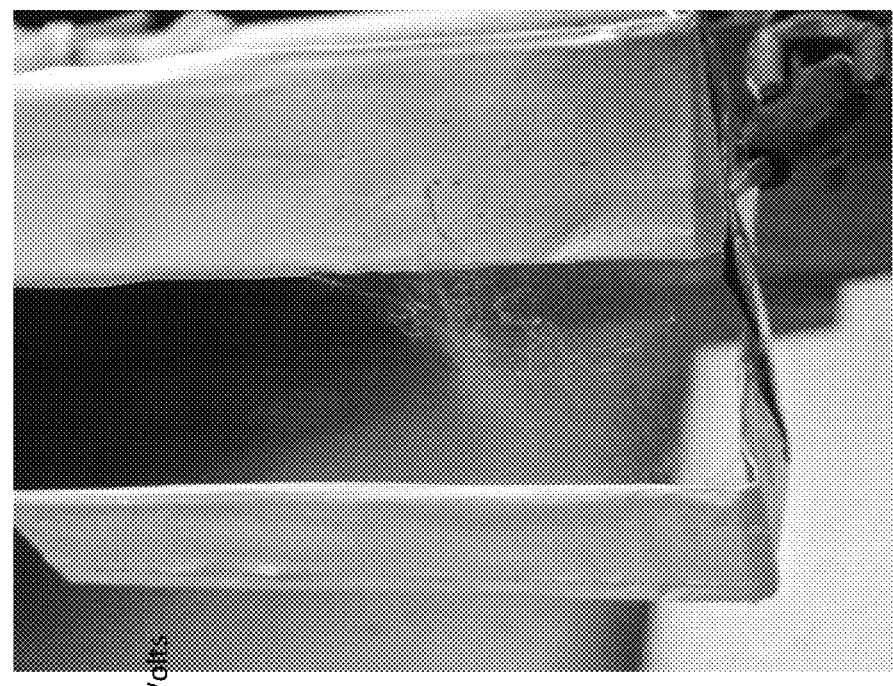
Figure 24A:
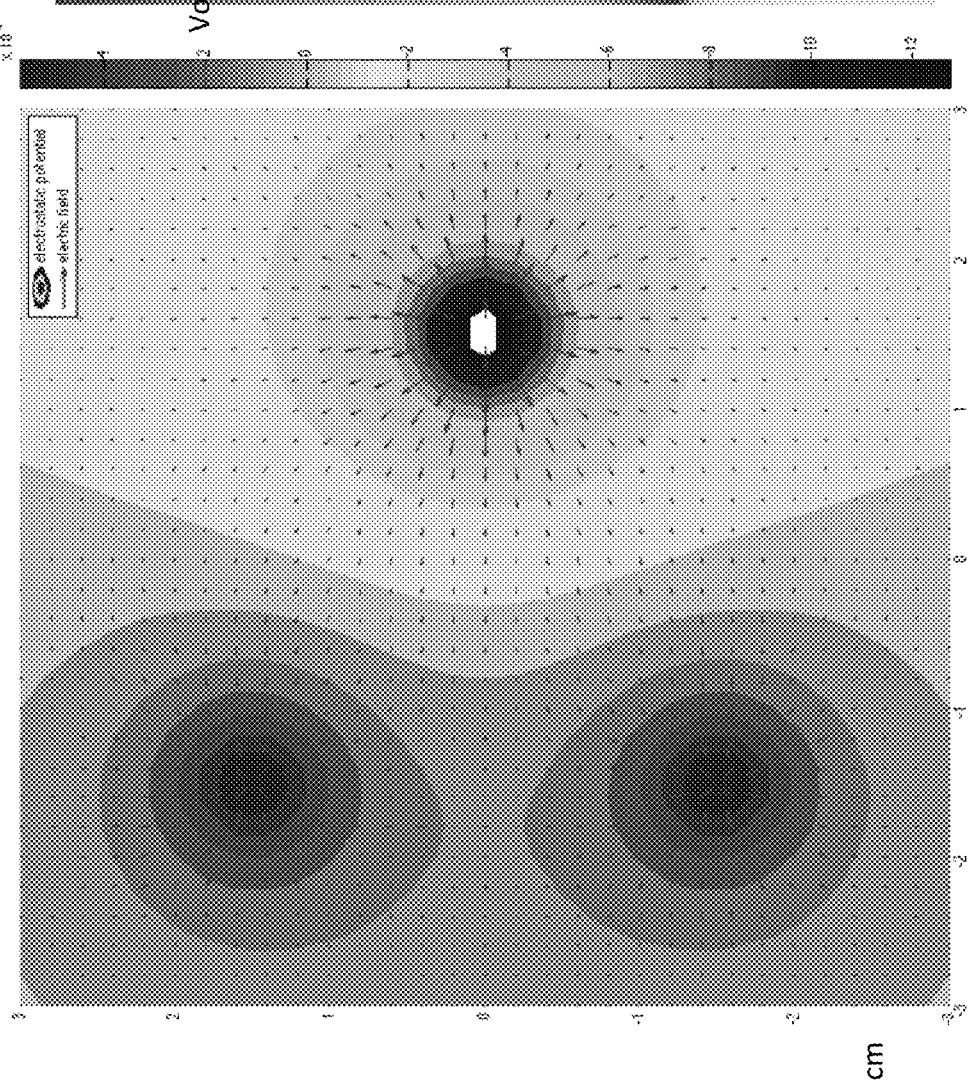

FIGS. 24A and 24B are, respectively, MATLAB model and experimental results of electric field during electrospinning, 3 cm distance.

Figure 25B:
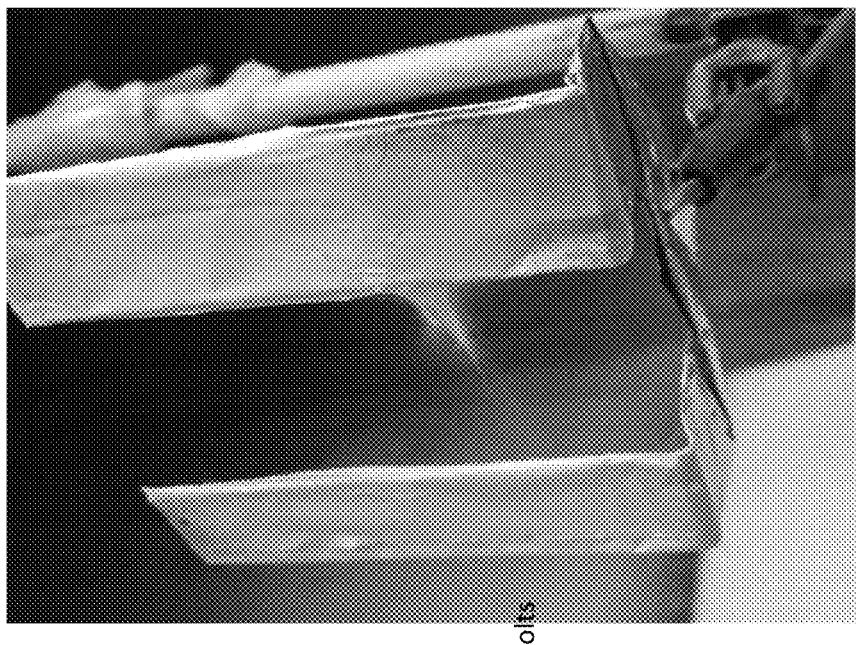
Figure 25A:
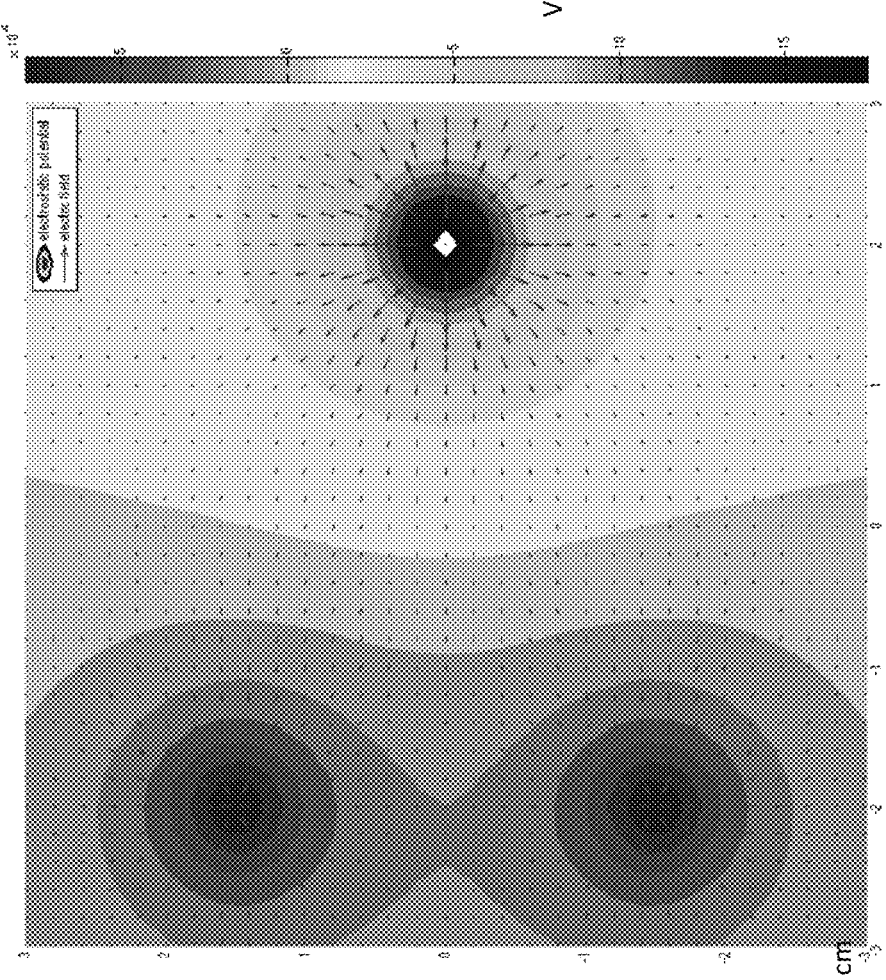

FIGS. 25A and 25B are, respectively, MATLAB model and experimental results of electric field during electrospinning, 4 cm distance.

FIGS. 26A and 26B are, respectively, MATLAB model and experimental results of electric field during electrospinning, 5 cm distance.

Figure 27B:
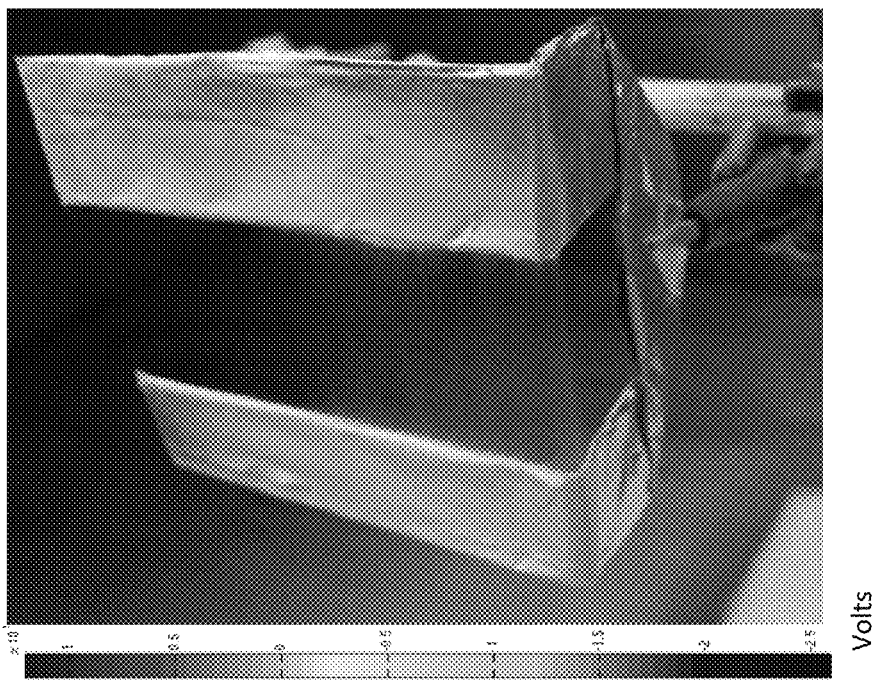
Figure 27A:
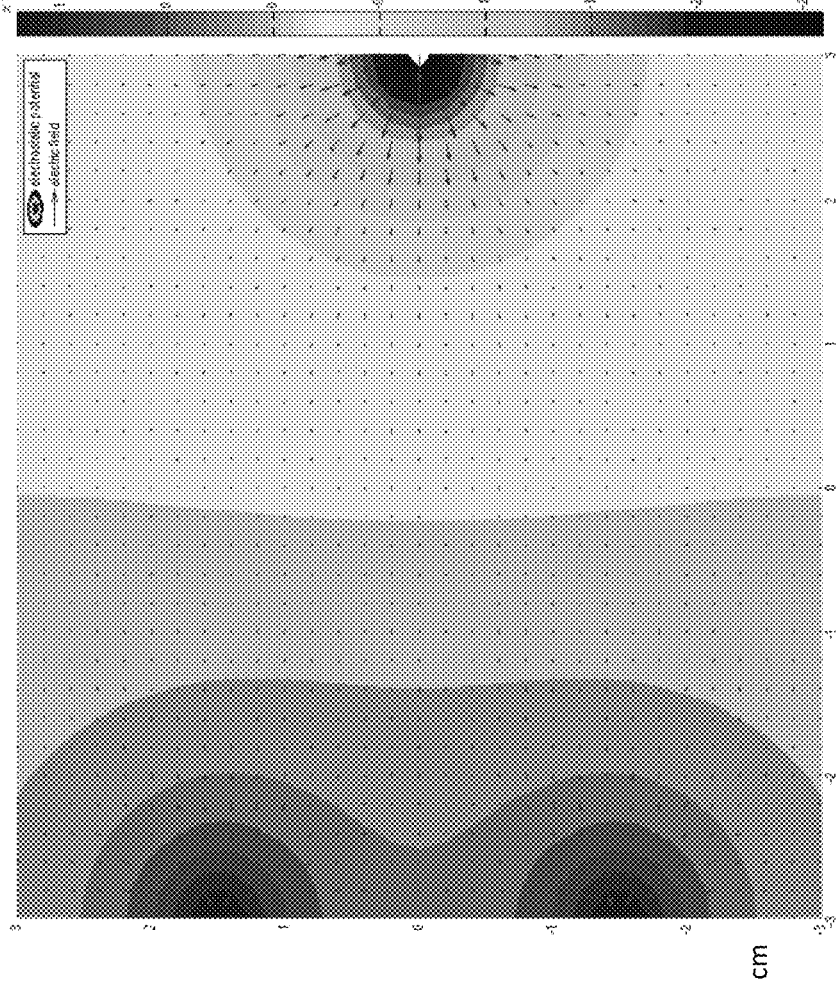

FIGS. 27A and 27B are, respectively, MATLAB model and experimental results of electric field during electrospinning, 6 cm distance.

Figure 28A:
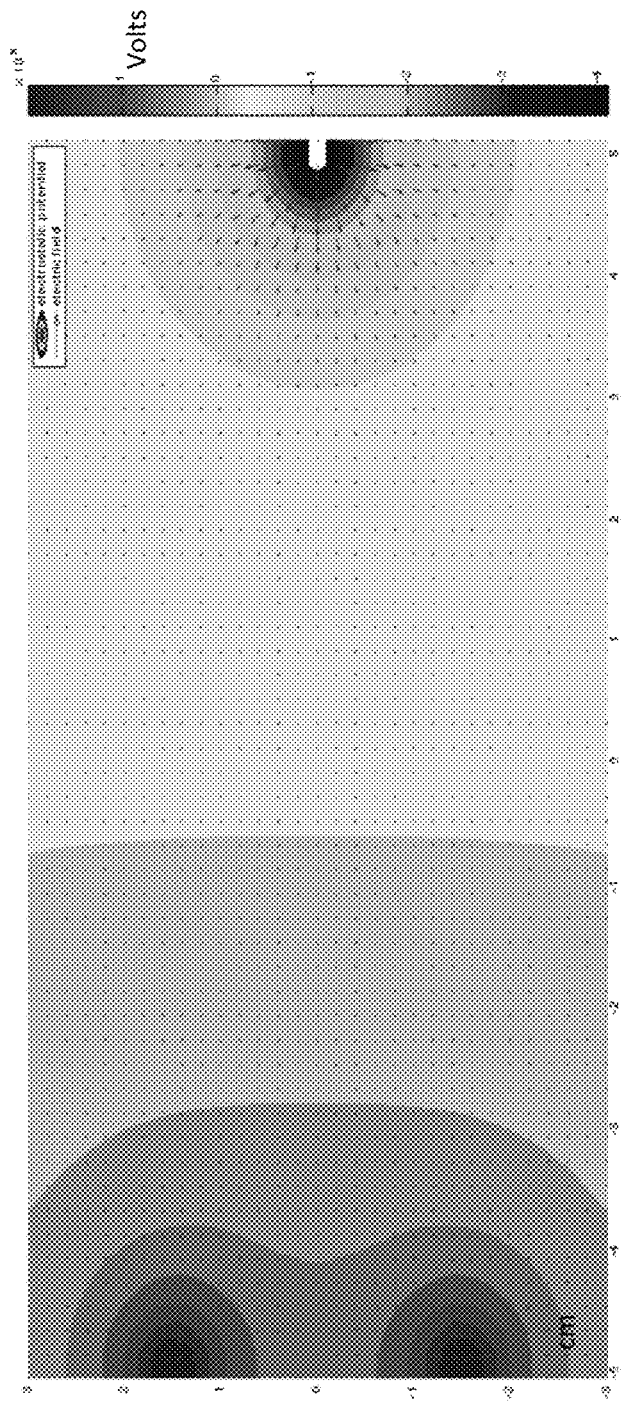
Figure 28B:
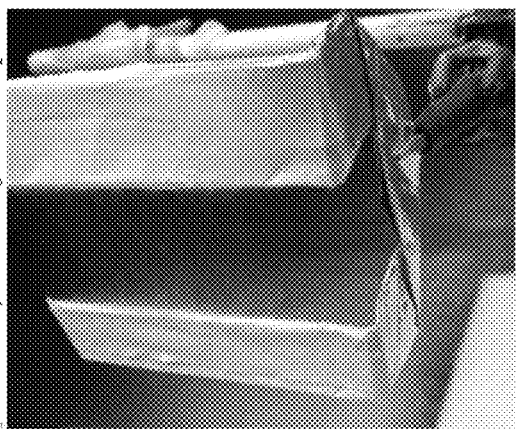

FIGS. 28A and 28B are, respectively, MATLAB model and experimental results of electric field during electrospinning, 10 cm distance.

Figure 29A:
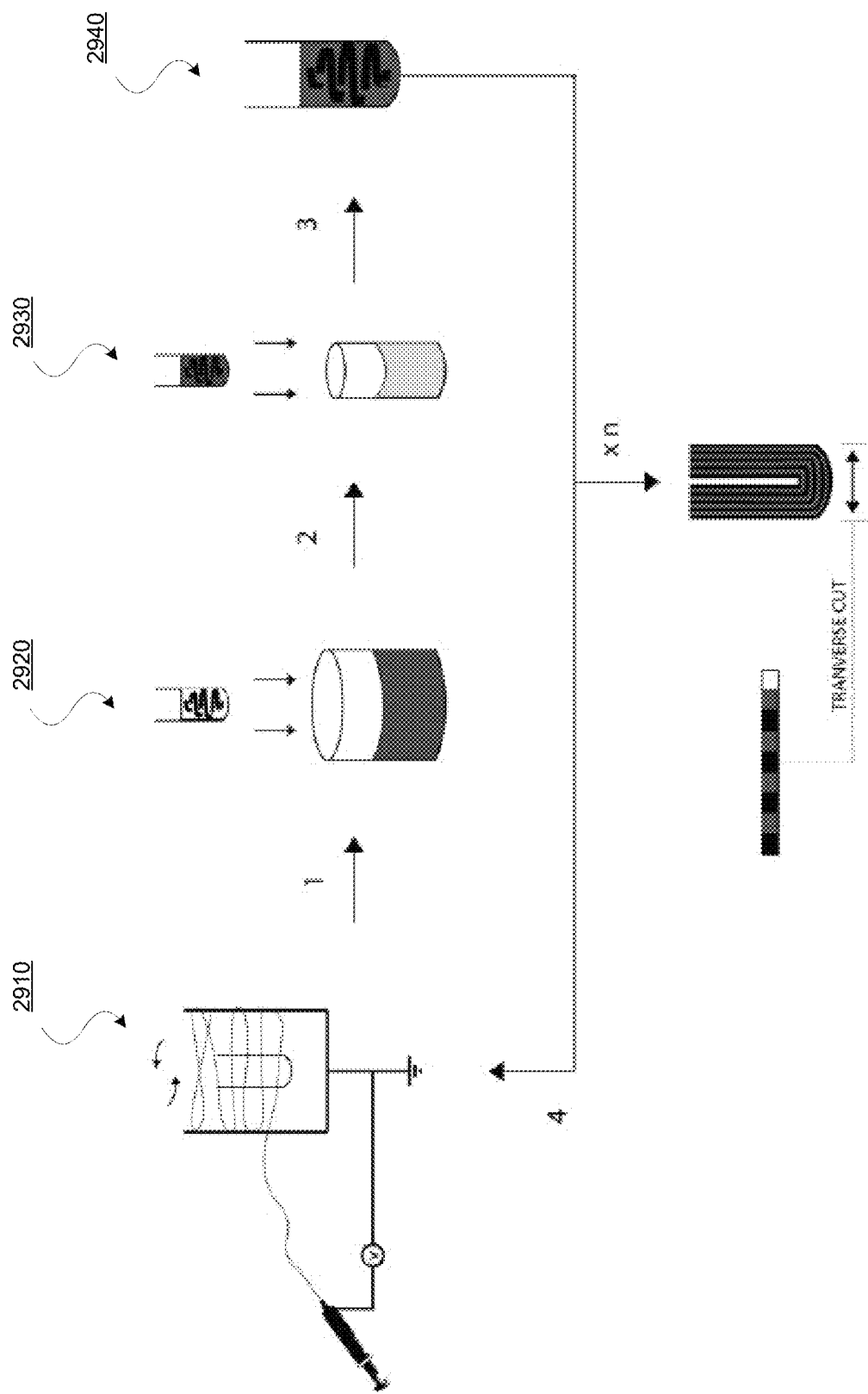
Figure 29B:
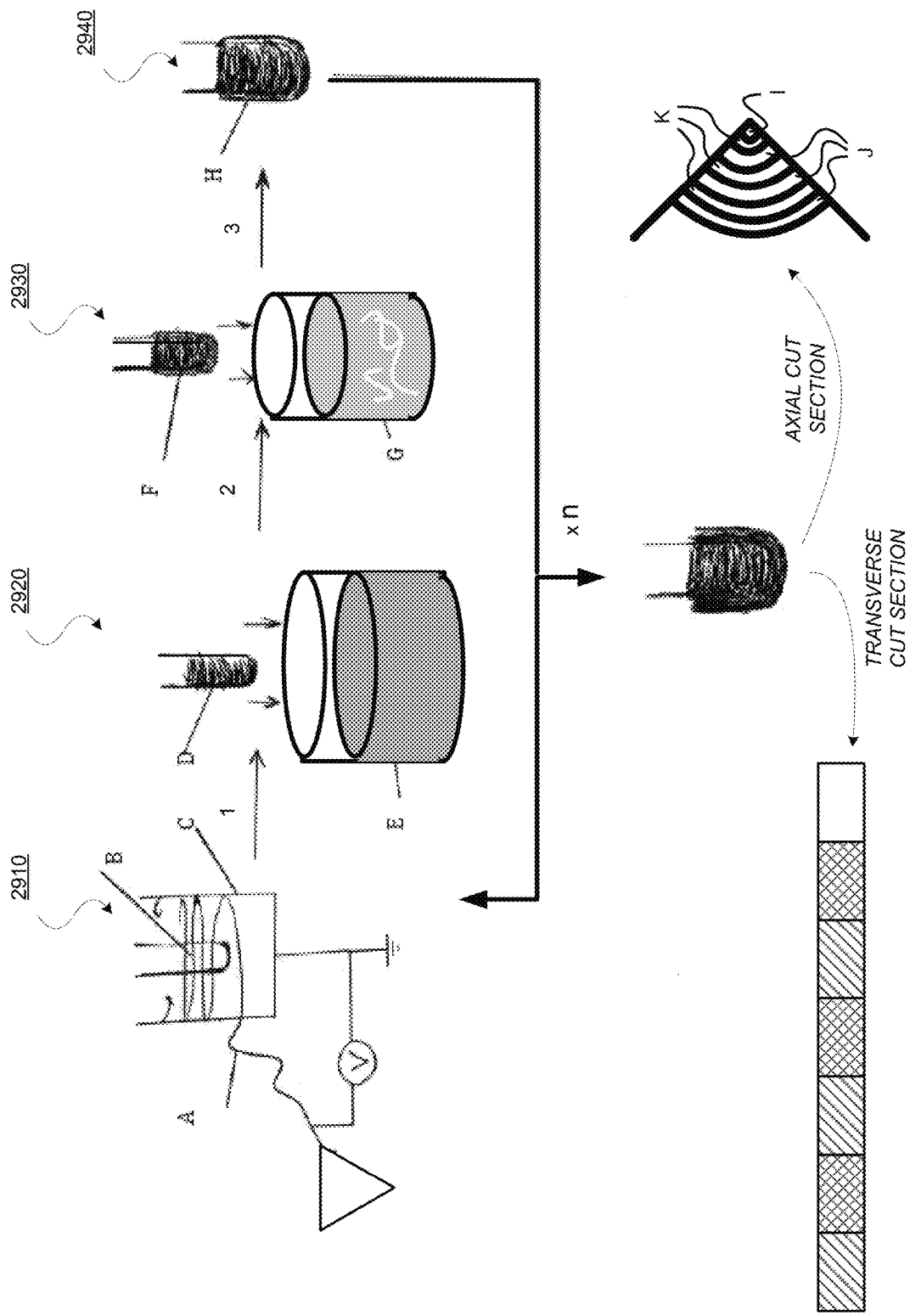

FIGS. 29A and 29B illustrate a process of fabricating a nanofiber-gel laminated article of manufacture.

Figure 30:

FIG. 30 is a photograph of a glass tube that has been inserted into the center of electrodes of electrospinning apparatus and coated for 5 minutes with a nanofiber.

Figure 31:
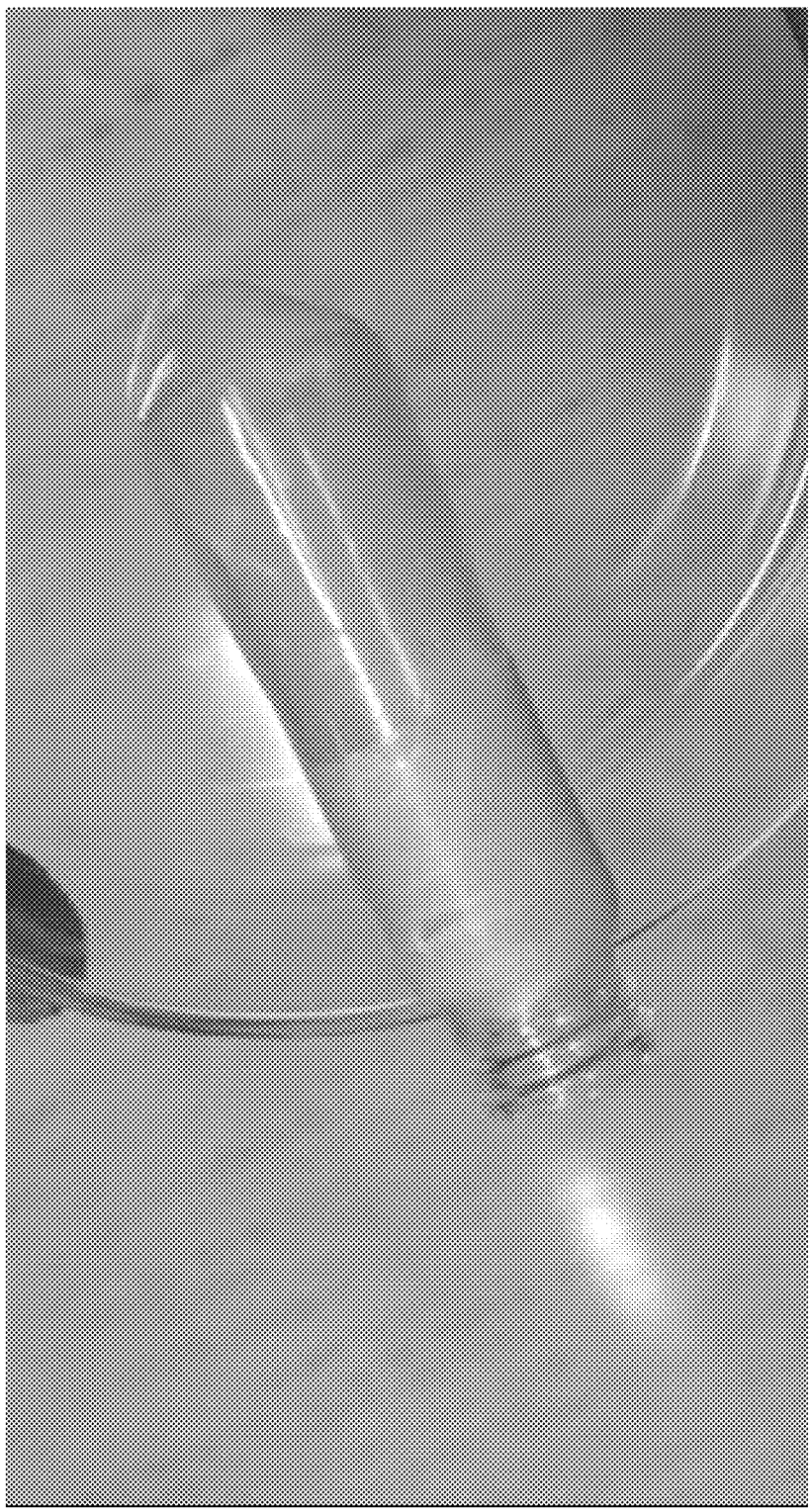

FIG. 31 is a photograph of a nanofiber/hydrogel laminated glass tube.

Figure 32:
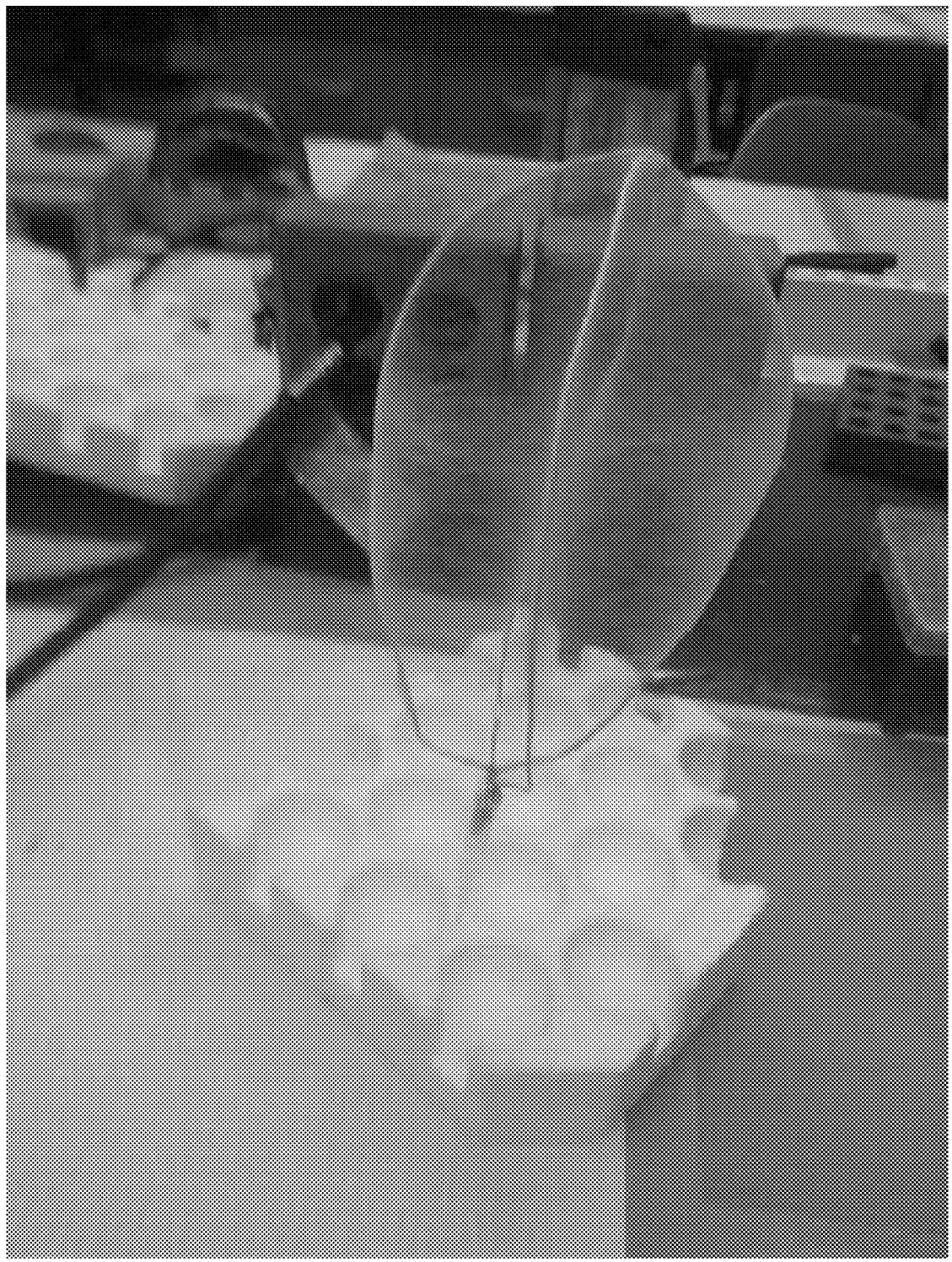

FIG. 32 is a photograph of nanofibers formed on aluminum wire electrodes.

§ 4. DETAILED DESCRIPTION

§ 4.1 Definitions

§ 4.1.1 Fiber Alignment

The meaning of "alignment" of fibers, such as nanofibers for example, is provided here. Deposited nanofiber is usually defined by the random "bending instability," a property of electrospinning still not very well understood, but known to be responsible for fiber thinning and elongation. To address this problem, example embodiments consistent with the present invention try to override bending instability by using a rotating dual collector design. While our design increases the alignment of nanofibers, bending instability still occurs and some fibers will not be aligned perfectly around the arbitrary axis of alignment. The following describes how one may evaluate empirically the alignment of nanofibers.

To analyze the nanofiber, the present inventors have used ImageJ software, version 1.48. ImageJ is an open source analytical program that allows for evaluation of visual data in an obtained image. Using the software, the present inventors were able to trace every visible line over the individual nanofibers on the presented SEM microscopy image. (See, e.g., FIG. 12.) ImageJ generates an angular output of the traced lines. FIG. 13 is a table including this data, as processed manually, and includes the observed angular counts within a certain degree range. On an ideally fiber, all fibers would be counted as angles around 90°. Again, due to bending whipping instability this is not the case. So an "aligned" nanofiber scaffold would have most angles around the central axis (90°), with other fibers normally distributed around it. This approach ensures that most fibers are aligned around the same axis and the least fibers are perpendicular to that axis. To test for normal distribution, normal distribution goodness of fit statistical analysis was used. This allows the data to be decomposed, and rearranged into how it would look like under ideal normal distribution. Observed data can then be compared to the ideal expected data. The output of such analysis is the Chi-square value, which, if fits into the critical value range, allows one to rule out the null hypothesis that the obtained nanofibers are not angularly normally distributed around the alignment axis.

Referring to FIG. 13, the table provides a sample Excel calculation table of statistical analysis of the angular distribution, based on ImageJ output, of PLA nanofibers formed on a rotating collector (1050 rpm, DCM:DMF 70:30 solvent). Individual z scores were calculated using:

$$z = \frac{x_i - \bar{x}}{s}$$

Expected frequency values were established using a normal distribution frequency table with matching z scores. Chi-square values were calculated as follows:

$$X^2 = \sum_{i=1}^{k} \left[ \frac{(O_i - E_i)^2}{E_i} \right],$$

where Oi and Ei are observed and expected angular counts, respectively. Here, probability of obtaining $X^2$ as large as 11.037 if the null hypothesis (that data is not normally distributed) is true is higher than 0.10, indicating that the angles might, in fact, be normally distributed around 90°.

Now, the obtained $X^2$ value can be compared to the established percentiles of the Chi-Square Distribution. For eight (8) degrees of freedom, we have $X^2_{90}$ of 13.362 and $X^2_{95}$ of 15.507. Our found value is lower than $X^2_{90,8DoF}$ so we can again conclude that angles might, in fact, be normally distributed around 90°. For comparison, $X^2$ value for the negative control static screen is 45.87, which is larger than $X^2_{90,8DoF}$ so the null hypothesis for that cannot be rejected (note, here we also compare to the same $X^2_{90,8DoF}$ because we have the same sample size hence same DoF in negative control, which is not necessarily the case for the whole experiment).

Thus, in the following, "aligned" may be defined in terms of p, given that the lower the p is, the closer is the match. Since, however, an "ideal" normal distribution count is recalculated for every trial, only how much the obtained results match the expected (under normal distribution) results can be evaluated. Hence, it is possible to determine, statistically, whether the fibers are "aligned" or "not aligned."

§ 4.1.2 Three Dimensional

In some instances, three dimension is meant to convey that fibers that are formed in multiple layers. A standard setup with a static screen forms random and interconnected (see SEM images for static control) fibers as a mat, which is different from a layered (3D) structure formed on a rotating collector consistent with the present invention.

§ 4.2 Example Apparatus for Producing 3D Nanofiber Structure

§ 4.2.1 Linear, Single Piece Static Double Electrode Collector

FIG. 9 is a diagram illustrating a single piece two-electrode collector electrospinning apparatus setup and folding demonstration. As shown, the apparatus setup includes polymer solution 1, a spinneret needle (highlighted in green) 2, electrodes (Red positive and blue negative) 3, a folded single piece aluminum foil (e.g., grounding) counter-electrode collector 4. Note that the distance between electrodes, d, can easily be set during folding. In FIG. 9, the distance between the electrodes is 3 cm. The distance h here represents the distance between the spinning needle and collector electrodes.

To ensure an even charge distribution, a collector was prepared from a single piece aluminum foil (Reynolds Wrap Aluminum Foil). (In this research no cell work was performed, thus a relatively toxic but conductive and malleable metal was chosen.) Rolling the foil as shown in FIG. 9 and bending along the measured lines allowed for a formation of a single collector with two exposed parallel electrodes of equal length with distance din between, which is preset during folding.

As FIG. 9 shows, after folding, the collector (D) was attached to a (e.g., grounding) counter-electrode (C). After the polymer solution (A) was loaded into the syringe (Norm-Ject® 10 mL) and mounted onto the syringe pump (Harvard Apparatus 11 Plus Syringe Pump), electrode (C) was attached to the needle (20 gauge diameter) (B). Controlled distance between the needle and the collector h (chosen to be 10 cm for shown sample) and distance between two collecting electrodes, d (in FIG. 9, a sample 3 cm was chosen), was fixed during the entire spinning process. An electrode, as well as the counter-electrode, were attached to the voltage source (Ultravolt's HV Rack®) and a voltage regulation mode was set to provide a constant voltage throughout the entire electrospinning process.

§ 4.2.2 Conventional Static Screen Electrospinning Apparatus Setup, Negative Control (Optional)

As explained earlier, whipping instability creates randomness in nanofiber deposition onto the collector. To design a negative control, a setup which does not intervene with the random collecting process was chosen. For this apparatus setup, following an already established method of electrospinning as shown on FIG. 9, a horizontal apparatus was assembled with square shaped aluminum foil folded three times to form a screen with dimensions 10×10 cm$^2$. The screen was attached to the counter electrode as a single static collector. For that design the needle-collector distance h was fixed and was the same as during two-electrode collecting system.

§ 4.2.3 Rotating Two-Electrode Spindle Collector and Coating

FIG. 10 is a diagram illustrating an example rotating spindle electrospinning system consistent with the present invention. As shown, a parallel two electrode aluminum screen (A) is attached to a conducting aluminum wire (B). Transmitting aluminum wire (C) is coiled around and attached to a (e.g., grounding) counter-electrode (D). Magnetic stirring bar (E) provides rotation via stirrer (F). The circuit is complete through attachment of electrode to a needle with polymer solution (G).

The setup illustrated in FIG. 10 is based on the fact that a rotating conducting aluminum wire (National Hardware V2566 diameter 18 ga) (B, in black), is attached to another static transmitting aluminum wire (C, in grey), coiled around it and attached to a (e.g., grounding) counter-electrode (D). This prevents coiling of the transmitting wire C, since the conducting wire B can rotate inside of it C freely. Rotating parallel dual electrode aluminum screen (A), (folded as shown on FIG. 9, except for skipping the last step) is similar to the static setup discussed earlier. Rotation and its regulation is provided by the attached magnetic stirring bar (E) and the magnetic stirrer. Polymer loaded into a syringe (G), which is attached to an electrode, completes the circuit. The dual electrode collector was set up so that the central axis of rotation is exactly half the distance between the electrodes, d, to ensure an even distribution of centripetal force.

The setup of FIG. 10 allows for deposition of nanofiber onto the rotating electrodes; a material inserted into the rotating system is not subjected to current. FIG. 11 is a diagram illustrating an example system for coating an object (e.g., a glass tube or any other substrate that can be positioned within the rotating electrodes) during electrospinning weaving. As shown in FIG. 11, a needle (1102) attached to electrode expels the nanofiber jet onto the rotating collector (1104). A glass tube (1106) fixed in between the central axis of rotation collects the deposited nanofiber without conducting current. As shown in FIG. 11, a coating experiment setup is similar to the one of FIG. 10, but further includes a glass tube (1106) which is inserted into the central axis of rotation of collecting electrodes (1104) during the electrospinning. The glass tube was not attached to electrodes and was not subjected to current. Other substrates may be used instead. Other example substrates include, for example, a food product, a body part, etc.

§ 4.3 Example Methods for Producing 3D Nanofiber Structure

§ 4.3.1 Polylactic Acid Polymer Preparations

Commercial grade polylactate for all experiments in this work was obtained from MakerBot®, Large True Orange PLA Filament. Molecular weight (MW) of the polymer was not provided by the company. An filament was cut into pieces of an appropriate mass and solubilized in dichloromethane (DCM) (Sigma, anhydrous, ≥99.8%; vapor pressure 352 mmHg at 20° C. as provided by Sigma) with either Pyr (Sigma, anhydrous, 99.8%; vapor pressure 20 mmHg at 25° C. as provided by Sigma) or DMF (Sigma, anhydrous, 99.8%; vapor pressure 2.7 mmHg at 20° C. as provided by Sigma) at the ratios of DCM:Pyr 60:40 and DCM:DMF 70:30 via heating and stirring overnight. Solution was visually checked for homogeneous polymer solubilization in solvent. For the purpose of the experiments presented in this work, a fixed 7.5% w/w PLA solution was prepared in all cases. Of course, other concentrations can be used. Lower polymer concentrations were reported to produce a higher quality nanofiber, but since the commercial grade polymer's MW was not provided, it was assumed to be small, and a higher PLA concentration solution was chosen for electrospinning.

§ 4.3.2 Electrospinning Apparatus Parametric Setup

For all electrospinning experiments conducted, previously described parameters were adopted with consideration of developed MATLAB model (discussed later). Parameters were chosen as in the following table.

TABLE

| Parametric setup for electrospinning | |
|---|---|
| Parameter | Setup chosen/measured |
| Ambient Conditions | Standard temperature and pressure (~23° C. and 1 atm); no airflow |
| Between-electrode distance for dual screen collector, d | 3 cm |
| Electrode needle to collector distance, h | 10 cm |
| Applied voltage, U | 15,000 V, DC |
| Polymer delivery rate | 1.5 mL/h |
| Total volume of electrospun solution | 4 mL |
| Collector rotation | 0, 1050 rpm and 1350 rpm |
| Needle diameter | 20 ga, 0.91 mm outer, 0.60 mm inner |
| Solvent | Either DCM:Pyr or DCM:DMF* |
| Rotation | 0, 1050 rpm, 1350 rpm |

The versatility, in terms of polymer solution of the proposed method, was also tested. For this, two solvents, DCM:Pyr (higher conductivity) and DCM:DMF (lower conductivity) were tested. From this, the following eight setups were evaluated:

TABLE

Solvent choice for eight electrospinning experiments

| Electrospinning Setup | First experiment solvent chosen | Second experiment solvent chosen |
|---|---|---|
| Static screen collector (negative control) | DCM:Pyr | DCM:DMF |
| Static dual electrode collector | DCM:Pyr | DCM:DMF |
| Rotating dual electrode collector, 1050 rpm | DCM:Pyr | DCM:DMF |
| Rotating dual electrode collector, 1350 rpm | DCM:DMF | second experiment not conducted |
| Coating experiment | DCM:DMF | second experiment no conducted |

Four example setups, as well as diametric measurements of nanofibers made with different electrospinning methods and/or parameters, are described in §§ 4.3.3-4.3.7 below.

§ 4.3.3 Example 1: Standard Setup

The parameters used in a first example electrospinning method are provided in the following table:

| Parameter | Setup chosen/measured |
|---|---|
| Ambient Conditions | Standard temperature and pressure (~23° C. and 1 atm); no airflow |
| Between-electrode distance for dual screen collector, d | 3 cm |
| Electrode needle to collector distance, h | 10 cm |
| Applied voltage, U | 15,000 V, DC |
| Polymer delivery rate | 1.5 mL/h |
| Total volume of electrospun solution | 4 mL |
| Collector rotation | 1050 rpm |
| Needle diameter | 20 ga, 0.91 mm outer, 0.60 mm inner |
| Solvent | DCM:DMF 70:30 |

Note
that DCM is Dichloromethane,
DMF is N,N-Dimethylformamide
(vapor pressure 2.7 mmHg at 20° C., conductivity 0.9-1.5 µS/cm at 25° C.).

FIGS. 14A and 14B are bright-field microscopy photographs of electrospun PLA nanofiber (7.5% w/w), with solvent DCM:DNIF. FIG. 14A is the result when using a control static screen collector at 400×. FIG. 14B is the result when using a rotating dual electrode collector at 1050 rpm and 1000×.

FIGS. 15A and 15B are SEM microscopy photographs depicting the alignment of PLA nanofibers during deposition onto a rotating dual electrode collector at 1050 rpm (at 2000×) and a static screen negative control (at 10,000×), respectively. In each case, the solvent was DCM:DMF. Note the horizontal alignment of the nanofibers in FIG. 15A as compared with those of FIG. 15B.

FIG. 16 is a plot depicting an angular distribution of nanofiber deposited on rotating collector, 1050 rpm. Observed count (expected with 90° angle highlighted) vs from normal distribution around 90°. The solvent is DCM:DMF. In blue is the hypothetical axis of nanofiber alignment. N=103, DoF=8. The angular distribution was measured using ImageJ software, version 1.48. $H_0$: sample is not normally distributed around 90°. Student t-test: $t_{observed} < t_{crit}$, $p<0.05$. Chi-Square test of goodness of fit: $X^2 = 11.037$; $X^2_{90} > X^2$. The p value of obtaining a value of $X^2$ as large as 11.037 if $H_0$ is true is higher than 0.10. Reject $H_0$; angles of fiber deposition around a rotating collector of 1050 rpm, using DCM:DMF solvent, may be distributed normally around 90°.

§ 4.3.4 Example 2: Changing Collector Rotation Speed

| Parameter | Setup chosen/measured |
|---|---|
| Ambient Conditions | Standard temperature and pressure (~23° C. and 1 atm); no airflow |
| Between-electrode distance for dual screen collector, d | 3 cm |
| Electrode needle to collector distance, h | 10 cm |
| Applied voltage, U | 15,000 V, DC |
| Polymer delivery rate | 1.5 mL/h |
| Total volume of electrospun solution | 4 mL |
| Collector rotation | 1350 rpm |
| Needle diameter | 20 ga, 0.91 mm outer, 0.60 mm inner |
| Solvent | DCM:DMF 70:30 |

FIG. 17 is a bright-field microscopy photograph at 1000×. Note the severed ends of the nanofibers. The inventors believe that the higher velocity rotation of the collector causes breaks ("ROIs") and discontinuous PLA nanofiber formation.

FIG. 18 is a SEM microscopy photograph depicting the severance of nanofibers during their deposition on a fast rotating (1350 rpm) collector. Orange circles overlayed on the SEM microphotograph denote severed ends.

FIG. 19 is a plot depicting an angular distribution of nanofiber deposited on rotating collector, 1050 rpm. Observed count (expected with 90° angle highlighted) vs from normal distribution around 90°. The solvent is DCM:DMF. In blue is the hypothetical axis of nanofiber alignment. N=89, DoF=8. The angular distribution was measured using ImageJ software, version 1.48. $H_0$: sample is not normally distributed around 90°. Student t-test: $t_{observed} < t_{crit}$, $p<0.05$. Chi-Square test of goodness of fit: $X^2 = 13.460$; $X^2_{95} > X^2 > X^2_{95}$. The p value of obtaining a value of $X^2$ as large as 13.460 if $H_0$ is true between 0.05 and 0.10. Reject $H_0$; angles of fiber deposition around a rotating collector of 1350 rpm, using DCM:DMF solvent, may be distributed normally around 90°.

§ 4.3.5 Example 3: Changing Solvent

| Parameter | Setup chosen/measured |
|---|---|
| Ambient Conditions | Standard temperature and pressure (~23° C. and 1 atm); no airflow |
| Between-electrode distance for dual screen collector, d | 3 cm |
| Electrode needle to collector distance, h | 10 cm |
| Applied voltage, U | 15,000 V, DC |
| Polymer delivery rate | 1.5 mL/h |
| Total volume of electrospun solution | 4 mL |
| Collector rotation | 1050 rpm |
| Needle diameter | 20 ga, 0.91 mm outer, 0.60 mm inner |
| Solvent | DCM:Pyr 60:40 |

Note
that Pyr is Pyridine
(v.p. 20 mmHg at 25° C., conductivity 12.7 µS/cm at 22.4° C.)

FIG. 20 is a bright-field microscopy photograph of the PLA nanofiber at 400×, when DCM:pyr is used as a solvent and the collector rotation is 1050 rpm. Note the "beads on string" formations. The inventors believe that these are probably due to high vapor pressure and conductivity of Pyr associated with higher mass flow.

FIG. 21 is a SEM microscopy photograph of the PLA nanofiber at 1000×, when DCM:pyr is used as a solvent and the collector rotation is 1050 rpm. Again note the bead formations as well as "garland" (versus straight) fiber deposition. Again, the inventors believe that these are probably due to high vapor pressure and conductivity of Pyr associated with higher mass flow.

FIG. 22 is a plot depicting an angular distribution of nanofiber deposited on rotating collector, 1050 rpm. Observed count (expected with 90° angle highlighted) vs from normal distribution around 90°. The solvent is DCM:pyridine. In blue is the hypothetical axis of nanofiber alignment. N=74, DoF=8. The angular distribution was measured using ImageJ software, version 1.48. $H_0$: sample is not normally distributed around 90°. Student t-test: $t_{observed} < t_{crit}$, p<0.05. Chi-Square test of goodness of fit: $X^2 = 15.203$; $X^2_{95} > X^2 > X^2_{95}$. The p value of obtaining a value of $X^2$ as large as 15.203 if $H_0$ is true between 0.05 and 0.10. Reject $H_0$; angles of fiber deposition around a rotating collector of 0350 rpm, using DCM:Pyr solvent, may be distributed normally around 90°.

§ 4.3.6 Comparison of the Average Diameters of Example Methods

The following table includes diametric measurements of nanofibers made with different electrospinning methods and/or parameters.

| Collector type | Average diameter, nm | Standard error |
| --- | --- | --- |
| screen, pyridine (control) | 110.67 | 4.10 |
| rot1050, pyridine | 150.00 | 6.84 |
| screen, DMF (control) | 131.10 | 10.34 |
| rot1050, DMF | 94.91 | 3.11 |
| rot1350, DMF | 294.29 | 15.80 |

FIG. 23 summarizes this data.

§ 4.37 Example 4: Changing Needle to Collector Distance, Static with MATLAB Analysis FIGS. 24 to 28 show, side-by-side, MATLAB model and actual nanofiber distribution for different needle to collector distances. The remaining electrospinning parameters are summarized in the following table:

| Parameter | Setup chosen/measured |
| --- | --- |
| Ambient Conditions | Standard temperature and pressure (~23° C. and 1 atm); no airflow |
| Between-electrode distance for dual screen collector, d | 3 cm |
| Electrode needle to collector distance, h | 3, 4, 5, 6, 10 cm |
| Applied voltage, U | 15,000 V, DC |
| Polymer delivery rate | 1.5 mL/h |
| Total volume of electrospun solution | 4 mL |
| Collector rotation | 0 |
| Needle diameter | 20 ga, 0.91 mm outer, 0.60 mm inner |
| Solvent | DCM:DMF 70:30 |

FIGS. 24A and 24B are, respectively, MATLAB model and experimental results of electric field during electrospinning, 3 cm distance. Note the separation of electric potential between counter-electrodes and a low value of ~1*10$^4$V. Note also a disrupted, irregular nanofiber formation with one side preference when distance between needle and collector is too small.

FIGS. 25A and 25B are, respectively, MATLAB model and experimental results of electric field during electrospinning, 4 cm distance. Note the shared potential between counter-electrodes ~2.5*10$^4$V. Note also an uneven, one-sided distribution of nanofiber between two collecting electrodes.

FIGS. 26A and 26B are, respectively, MATLAB model and experimental results of electric field during electrospinning, 5 cm distance. Note the shared potential between counter-electrodes ~2.5*10$^4$V. Note also the gradient in nanofiber distribution between two collecting electrodes.

FIGS. 27A and 27B are, respectively, MATLAB model and experimental results of electric field during electrospinning, 6 cm distance Note a high shared potential between counter-electrodes ~0.5*10$^5$V. Note also a uniform nanofiber distribution between two collecting electrodes.

Finally, FIGS. 28A and 28B are, respectively, MATLAB model and experimental results of electric field during electrospinning, 10 cm distance Note a high shared potential overlap between counter-electrodes ~0.5*10$^5$V. Note also a uniform nanofiber distribution between two collecting electrode.

§ 4.4 Example 3D Nanofiber Structure

FIG. 32 is a photograph of nanofibers formed on aluminum wire electrodes. An example nanofiber product (preferably produced by the method of claim 1) has a distribution of angles of fibers with respect to an ideal (perfectly aligned) distribution that is within a predefined "aligned" range. An example nanofiber has an average diameter of fibers between 70 and 300 nm, for example between 94 and 295 nm. Note that the desired average diameter may depend on the intended application. For example, a desired average diameter might depend on cell type ideal interactions.

§ 4.5 Example Nanofiber-Gel Laminated Structure

As noted in section 4.3.2 above with reference to FIG. 11, a substrate (e.g., a glass tube) can be coated with spun nanofibers in a manner consistent with the present invention. The resulting nanofiber coated substrate may then be provided with a gel coating (e.g., by dipping the nanofiber coated substrate into solution of alginate (an anionic polymer), and then dipping into Ca solution (a cationic bivalent cross linker). Such electrospinning and dipping can be repeated to prepare a laminated article of manufacture having multiple, alternating layers of fibers and gels. Such laminated articles of manufacture may be very important when tissue engineering hierarchal complex structures.

One example method for making such a laminated article of manufacture is described below with reference to FIGS. 29A and 29B. As the polymer solution, PLA, 7.5% w/w in Dichloromethane:N,NDimethylformamide 70:30, is used. As the alginic acid solution, potassium alginate in water, 2.5% w/w, is used. As a Calcium Chloride solution, CaCl2 in water, 2.5% w/w, is used. Referring to FIG. 29A, first, the polymer is loaded into a syringe and a electrospinning weaving (1050 rpm, 15 kV DC) is initiated. More specifically, a glass tube is inserted into the center of the electrodes and coated for 5 minutes with a nanofiber, as depicted by 2910 of FIG. 29A, as well as FIG. 30. The resulting nanofiber coated tube is then dipped into an alginate solution (as depicted by 2920) and swiftly transferred and dipped into a calcium chloride solution (as depicted by 2930) to crosslink the viscous alginate solution, thereby forming a hydrogel layer around (as depicted by 2940 of FIG. 29A, as well as FIG. 30B). The resulting gel and nanofiber coated tube is then inserted into the center of the electrospinning electrodes once again, and the whole process is repeated n times (See, e.g., FIG. 29A) to form a nanofiber/hydrogel laminated tube. (See, e.g., FIG. 31.).

Referring to the gel-nanofiber coating setup of FIG. 29B, initially, an electrospinning weaving setup is constructed with a PLA nanofiber (A) forming on the collector (C). A glass tube (B) is inserted into the central axis of rotation and is coated with nanofiber (D, first layer in black). The glass tube with first layer of nanofiber is dipped into the alginate solution (E, in red). The glass tube with nanofiber and alginate (F) is then dipped into CaCl2 solution (G, yellow) to crosslink the alginate. This forms a layer of hydrogel around the nanofiber (H). 4. This procedure is repeated multiple times to form a multilayered structure. I is the glass tube layer, K are the nanofiber layers and J are the formed alginate layers.

The foregoing procedure and/or materials can be modified, especially the gelation process. For example, instead of using alginate, another anionic polymer such as carrageenan, or other anioinic polysaccharides, polyacrylic acids, or other anionic synthetic polyelectrolytes. for example, may be used instead. Further, instead of using a cationic bivalent cross linker such as a Ca solution, another cationic multivalent cross linker such as polyethyleneimine, or polylysine may be used instead. Gels can also be formed with cationic polymers such as polyethylene imine with anionic multivalent crosslinkers or covalent crosslinkers such as glutaraldehyde. In addition, gel layers may be produced by photocrosslinking, other covalent crosslinkings, interpolymer complexations or other multipolymer complexes.

Although the laminated article of manufacture having multiple, alternating layers of fibers and gels were described as using a PLA nanofiber, any synthetic or biological material capable of forming a fiber (such as the alternatives described in § 4.6 below) may be used instead.

Although not shown, cells can be introduced before coating with alginate or crosslinking. For example, stem cells may be introduced, at various steps, into the gels. Thus, "soft material" may be introduced into the woven structures.

§ 4.6 Refinements, Alternatives and Extensions iA mechanical stress-strain analysis may be used to evaluate strength and stiffness of the created PLA nanofiber. Cytotoxicity may also be analyzed. Understanding these parameters is import to assess the suitability of the created mesh for use in tissue engineering of various tissues.

Although polylactic acid preparations were described in § 4.3.1 above, other polymers can be used instead. Such alternative polymers may include, for example, any commercial thermoplastic polymer if soluble, any commercial elastomeric polymer if soluble, and any thermosetting polymer if the setting completed after spinning. Any of the above may be done in the lab with any polymerization method: Enzymatic, condensation, free radical, electrochemical, template or any other polymerization method. That is, the polymers can be prepared by different methods In some embodiments, the polymer may be mixed with another polymer. For example, a polymer blend with miscible of phase separated morphology; phase separated by nucleation and growth or spinodal phase separation mechanism. That is, in addition to single polymers, but multiples in mixtures, blends with different morphologies, etc., may be used instead.

In some example embodiments consistent with the present invention, the polymer chemical composition may be copolymer made of various monomers, block copolymer similarly, dendrimer or other macromolecule, liquid crystalline and/or semicrystalline polymer.

Further, in some example embodiments consistent with the present invention, the polymer may be filled with functional nanoparticles, drug, therapeutics, gels, drug delivery systems, DNA, siRNA, mRNA, proteins, viruses, bacteria or any other inorganic, organic or biological entity. In addition, a polymer composite (e.g., filled with inorganic, carbon nanotubes, fullerenes or any modifications of the ones, grapheme and grapheme modifications) may be used.

In any event, the molecular weight of the polymer (or polymer blend, or polymer chemical composition, etc.) should be large enough to allow formation of a nanofiber.

Although the syringe is fixed in some of the foregoing example embodiments, it can be moved up and/or down with respect to the collector. Otherwise, a gradient with fibers concentrated at the center may result. Fibers might be even more concentrated if the electrodes frame a concave shape. Thus, in some example embodiments consistent with the present invention, the syringe dispensing the polymer solution can be moved in one or more of the x,y,z directions. Alternatively, or in addition, in some example embodiments consistent with the present invention, the receiving electrode system can be moved in one or more of the x,y,z directions. Various shapes and/or thickness gradients can be obtained by controlling (such as continuously changing) one or more of x, y, z positions of the syringe and/or the receiving electrode system.

In some example embodiments consistent with the present invention, the material to be coated and/or the formed fiber shapes can be "surface modified" so that they become cationic, anionic, hydrophobic, or hydrophilic. This may be done to increase their affinity for other materials to absorb onto them. For example, anionic or cationic polyelectrolytes, synthetic or biological, can be attached to the surfaces for various reasons, such as for improved functionalities.

Referring back to section 4.5 above, in some example embodiments consistent with the present invention, one of the functionalities may be a gel formation when the attached polyelectrolytes then bind with bi (or multi)functional molecules like Ca2+ to crosslink and form gels on the surface of the material to be coated. During such an example gelation process, other functional materials (e.g., proteinuous growth factors, signaling agents like cytokines and cells such as stem cells) can be added. These functional material(s) can be added by dipping into, pouring into, dispensing into, injecting, and/or printing and forming various gradients, diffusive layers and compositions.

In some example embodiments consistent with the present invention, after the nanofiber is produced, the electrodes can be removed, and perhaps replaced with a frame having a different material. (For example, a material that cells have an affinity for.)

§ 4.7 Conclusions

Known mats of nanofilaments are too dense for tissue engineering. Nanofibers fabricated using the foregoing techniques are expected to have many applications, such as tissue engineering (e.g., tissue scaffolding) for example. Other potential applications include, for example, filters, protective clothing, stain resistant fabrics, drug delivery media/encapsulation (e.g., for control of delivery rate), light-weight solar sails, aircraft wings, and bullet proof vests, fuel cell membranes, food encapsulation, soft candy, ice cream and all kinds of food coating.

What is claimed is:

1. A method for producing a three dimensional nanofiber structure, the method comprising:
   a) rotating, around an axis of rotation, at least two spaced electrodes provided at a first electric potential, wherein a spacing of the at least two spaced electrodes with respect to each other is orthogonal to the axis of rotation; and
   b) ejecting a polymer solution from a syringe, provided at a second electric potential which is different from the first electric potential, towards the at least two spaced electrodes while the at least two spaced electrodes are rotating.

2. The method of claim 1 wherein the syringe is spaced between 3-10 cm from the at least two spaced electrodes.

3. The method of claim 1 wherein the at least two spaced electrodes rotate at a speed of 1000-1500 rpm.

4. The method of claim 1 wherein a difference between the first electric potential and the second electric potential is at least 10,000 V DC.

5. The method of claim 1 wherein the polymer solution is ejected from the syringe at a rate of at least 1 mL per hour.

6. The method of claim 1 wherein the syringe has a 20 ga needle.

7. The method of claim 1 further comprising:
   moving the syringe relative to the at least two spaced electrodes while the at least two spaced electrodes are rotated and the polymer solution is ejected.

8. The method of claim 1 wherein at least one of the first and second electric potentials is ground.

9. A method comprising:
   a) rotating at least two spaced electrodes provided at a first electric potential; and
   b) ejecting a polymer solution from a syringe, provided at a second electric potential which is different from the first electric potential, towards the at least two spaced electrodes while the at least two spaced electrodes are rotating; and
   c) providing a substrate within a space defined by the rotation of the at least two spaced electrodes, wherein the polymer solution ejected from the syringe is also directed towards the substrate, thereby providing nanofibers on the substrate.

10. The method of claim 9 further comprising:
    providing, after the substrate has been provided with nanofibers, a gel layer onto the nanofibers provided on the substrate.

11. The method of claim 10 wherein the gel layer is provided onto the nanofibers provided onto the substrate by (1) dipping the nanofiber-provided substrate into an alginate solution, and (2) then dipping the resulting nanofiber-provided substrate into CaCl2) solution to crosslink the alginate.

12. The method of claim 1 wherein the at least two spaced electrodes rotate at a speed of 1050-1350 rpm.

13. The method of claim 1 wherein a difference between the first electric potential and the second electric potential is at least 15,000 V DC.

14. The method of claim 1 wherein the polymer solution is ejected from the syringe at a rate of at least 1.5 mL per hour.

15. The method of claim 1 wherein the two spaced electrodes are spaced from the axis of rotation.

16. The method of claim 1 wherein a void is defined between the two spaced electrodes.

17. The method of claim 1 wherein the at least two spaced electrodes are spaced from one another at a distance of D, and wherein each of the at least two spaced electrodes are spaced from the axis of rotation at a distance of D/2.

18. The method of claim 1 wherein each of the at least two spaced electrodes is spaced from the axis of rotation by an equal distance.

19. The method of claim 1 wherein each of the at least two spaced electrodes is shaped as a prong having one open end and one attached end.

* * * * *